(12) United States Patent
He et al.

(10) Patent No.: US 9,014,064 B2
(45) Date of Patent: Apr. 21, 2015

(54) SCHEDULING AND HYBRID AUTOMATIC REPEAT REQUEST (HARQ) TIMING INDICATION FOR AN UPLINK-DOWNLINK (UL-DL) RECONFIGURATION

(71) Applicants: Hong He, Beijing (CN); Jong-Kae Fwu, Sunnyvale, CA (US); Debdeep Chatterjee, Santa Clara, CA (US)

(72) Inventors: Hong He, Beijing (CN); Jong-Kae Fwu, Sunnyvale, CA (US); Debdeep Chatterjee, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 145 days.

(21) Appl. No.: 13/741,776

(22) Filed: Jan. 15, 2013

(65) Prior Publication Data
US 2013/0301490 A1 Nov. 14, 2013

Related U.S. Application Data

(60) Provisional application No. 61/646,223, filed on May 11, 2012.

(51) Int. Cl.
*H04J 3/00* (2006.01)
*H04J 3/16* (2006.01)
(Continued)

(52) U.S. Cl.
CPC ............ *H04J 3/1694* (2013.01); *H04B 7/26* (2013.01); *H04W 24/10* (2013.01); *H04W 72/0413* (2013.01); *H04W 72/085* (2013.01); *H04W 36/00* (2013.01); *H04J 3/00* (2013.01); *H04B 1/56* (2013.01); *H04W 56/00* (2013.01); *H04W 52/0235* (2013.01); *H04W 52/0212* (2013.01); *H04W 76/027* (2013.01); *H04W 72/042* (2013.01); *H04W 4/22* (2013.01); (Continued)

(58) Field of Classification Search
USPC .......................................... 370/280, 294, 297
See application file for complete search history.

(56) References Cited

U.S. PATENT DOCUMENTS 8,705,556 B2 * 4/2014 Wang et al. .................... 370/431
2013/0039272 A1 * 2/2013 Chen ............................ 370/328
(Continued)

FOREIGN PATENT DOCUMENTS

| WO | 2011/071310 A2 | 6/2011 |
| WO | 2011/084026 A2 | 7/2011 |
| WO | 2013/170121 A1 | 11/2013 |

OTHER PUBLICATIONS

International Search Report and Written Opinion received for PCT Application No. PCT/US2013/040496, mailed on Aug. 28, 2013, 10 pages.
(Continued)

*Primary Examiner* — Mohammad Anwar
(74) *Attorney, Agent, or Firm* — Thorpe North & Western LLP

(57) ABSTRACT

Technology for reconfiguring an uplink-downlink (UL-DL) time-division duplexing (TDD) configuration timing is disclosed. In an example, a user equipment (UE) for reconfiguring an uplink-downlink (UL-DL) time-division duplexing (TDD) configuration timing can have computer circuitry configured to: Decode a physical downlink control channel (PDCCH) for downlink control information (DCI) including a timing indication field (TIF); and reconfigure a channel timing for a semi-static UL-DL TDD configuration using the TIF. The channel timing can include a physical downlink shared channel (PDSCH) hybrid automatic repeat request (HARQ) timing, a physical uplink shared channel (PUSCH) scheduling timing, or a PUSCH HARQ timing.

27 Claims, 17 Drawing Sheets

(51) Int. Cl.
| | |
|---|---|
| *H04B 7/26* | (2006.01) |
| *H04W 24/10* | (2009.01) |
| *H04W 72/04* | (2009.01) |
| *H04W 72/08* | (2009.01) |
| *H04W 36/00* | (2009.01) |
| *H04B 1/56* | (2006.01) |
| *H04W 56/00* | (2009.01) |
| *H04W 52/02* | (2009.01) |
| *H04W 76/02* | (2009.01) |
| *H04W 4/22* | (2009.01) |
| *H04W 36/22* | (2009.01) |
| *H04B 15/00* | (2006.01) |
| *H04B 7/02* | (2006.01) |
| *H04B 7/04* | (2006.01) |
| *H04B 7/06* | (2006.01) |
| *H04W 24/02* | (2009.01) |
| *H04W 72/12* | (2009.01) |
| *H04L 29/02* | (2006.01) |
| *H04W 4/06* | (2009.01) |
| *H04W 48/20* | (2009.01) |
| *H04W 88/06* | (2009.01) |
| *H04W 76/04* | (2009.01) |
| *H04W 72/02* | (2009.01) |
| *H04W 4/00* | (2009.01) |
| *H04W 16/14* | (2009.01) |

(52) U.S. Cl.
CPC .............. *H04W 36/22* (2013.01); *H04B 15/00* (2013.01); *H04W 72/082* (2013.01); *H04B 7/024* (2013.01); *H04B 7/0456* (2013.01); *H04B 7/063* (2013.01); *H04B 7/0632* (2013.01); *H04B 7/0639* (2013.01); *H04B 7/0647* (2013.01); *H04W 24/02* (2013.01); *H04W 72/1215* (2013.01); *H04L 29/02* (2013.01); *H04W 4/06* (2013.01); *H04W 48/20* (2013.01); *H04B 7/0473* (2013.01); *H04B 7/0486* (2013.01); *H04B 7/065* (2013.01); *H04W 88/06* (2013.01); *H04W 76/048* (2013.01); *H04W 72/02* (2013.01); *Y02B 60/50* (2013.01); *H04W 4/005* (2013.01); *H04W 16/14* (2013.01)

(56) References Cited

U.S. PATENT DOCUMENTS

| | | | | |
|---|---|---|---|---|
| 2013/0072237 | A1* | 3/2013 | Ramdeo | 455/466 |
| 2013/0194980 | A1* | 8/2013 | Yin et al. | 370/280 |
| 2013/0260821 | A1* | 10/2013 | Deparis et al. | 455/553.1 |

OTHER PUBLICATIONS

Alcatel-Lucent Shanghai Bell, et al. "Discussion on HARQ timing with dynamic TOO UL-DL configuration" R1-120513, 3GPP TSG RAN WG1 Meeting #68, Dresden, German, Feb. 6-10, 2012, 4 pages.

Ericsson, et al. "Specification impact of TDD traffic adaptation" R1-121709, 3GPP TSG-RAN WGI #68bis, Jeju, Korea, Mar. 26-30, 2012, 4 pages.

LG Electronics, "Issues in Further Enhancements to LTE TDD" R1-121461, 3GPP TSG-RAN WG1 #68bis, Jeju, Korea, Mar. 26-30, 2012, 5 pages.

Evolved Universal Terrestrial Radio Access (E-UTRA); Physical layer procedures (Release 10), 3GPP TS 36.213 V10.1.0, 115 pages.

Evolved Universal Terrestrial Radio Access (E-UTRA); Physical Channels and Modulation (Release 10), 3GPP TS 36.211 V10.1.0, 115 pages.

* cited by examiner

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | - | - | 6 | - | 4 | - | - | 6 | - | 4 |
| 1 | - | - | 7, 6 | 4 | - | - | - | 7, 6 | 4 | - |
| 2 | - | - | 8, 7, 4, 6 | - | - | - | - | 8, 7, 4, 6 | - | - |
| 3 | - | - | 7, 6, 11 | 6, 5 | 5, 4 | - | - | - | - | - |
| 4 | - | - | 12, 8, 7, 11 | 6, 5, 4, 7 | - | - | - | - | - | - |
| 5 | - | - | 13, 12, 9, 8, 7, 5, 4, 11, 6 | - | - | - | - | - | - | - |
| 6 | - | - | 7 | 7 | 5 | - | - | 7 | 7 | - |

```
-- ASN1START

MasterInformationBlock ::=      SEQUENCE {
    dl-Bandwidth                    ENUMERATED {n6, n15, n25, n50, n75, n100},
    phich-Config                PHICH-Config,
    systemFrameNumber               BIT STRING (SIZE (8)),
    tdd-Config                      TDD-Config              OPTIONAL, -- Cond TDD
    spare                           BIT STRING (SIZE (7))
}

-- ASN1STOP
```

FIG. 8A

| DL Ratio | \multicolumn{10}{c}{subframe number n} | TIF =1 |
|---|---|---|---|---|---|---|---|---|---|---|---|
|  | 0 | 1 | 2 | 3 | 4 | 5 | 6 | 7 | 8 | 9 |  |
| 40% |  |  | 7,6 |  |  |  |  | 7,6 |  |  | Null |
| 50% |  |  | 7,6 | 4 |  |  |  | 7,6 |  |  | Null |
| 60% |  |  | 7,6 | 4 |  |  |  | 7,6 | 4 |  | Null |
| 70% |  |  | 7,6,8 | 4,5 |  |  |  | 7,6 |  |  | 4 |
| 80% |  |  | 7,6,8,13,4 |  |  |  |  | 7,6,4 |  |  | 4,9,8 |
| 90% |  |  | 7,6,8,13,4,12,9,5,11 |  |  |  |  |  |  |  | 4,9,8, 0,1,3 |

Decreasing ↑ (40%–60%), Increasing ↓ (70%–90%)

SIB1 Configuration: Configuration 1

Subframe index with "TIF =1" in DCI format for DL grant if transmitted

FIG. 8B

| UL Ratio | \multicolumn{10}{c}{subframe number n} | TIF =1 |
|---|---|---|---|---|---|---|---|---|---|---|---|
|  | 0 | 1 | 2 | 3 | 4 | 5 | 6 | 7 | 8 | 9 |  |
| 10% |  |  |  |  |  |  | 6 |  |  |  | Null |
| 20% |  | 6 |  |  |  |  | 6 |  |  |  | Null |
| 30% |  | 6 |  |  |  |  | 6 |  |  | 4 | Null |
| 40% |  | 6 |  |  | 4 |  | 6 |  |  | 4 | Null |
| 50% | 4 | 6 |  |  |  |  | 6 |  |  | 4 | 1 |
| 60% | 4 | 6 |  |  | 4 |  | 6 |  |  |  | 1,6 |

Decreasing (10%–30%), Increasing (40%–60%)

SIB1 Configuration: Configuration 1

FIG. 8C

| UL Ratio | \multicolumn{10}{c}{subframe number n} | TIF =1 |
|---|---|---|---|---|---|---|---|---|---|---|---|
|  | 0 | 1 | 2 | 3 | 4 | 5 | 6 | 7 | 8 | 9 |  |
| 10% |  |  | 4 |  |  |  |  |  |  |  | Null |
| 20% |  |  | 4 |  |  |  |  | 4 |  |  | Null |
| 30% |  |  | 4 | 6 |  |  |  | 4 |  |  | Null |
| 40% |  |  | 4 | 6 |  |  |  | 4 | 6 |  | Null |
| 50% |  |  | 4 | 6 | 6 |  |  | 4 | 13 |  | 1 |
| 60% |  |  | 4 | 13 | 6 |  |  | 4 | 13 | 6 | 1,6 |

Decreasing (10%–30%), Increasing (40%–60%)

SIB1 Configuration: Configuration 1

FIG. 11A

Increasing ↕ (40% → 90%)

| DL Ratio | subframe number n | | | | | | | | | | TIF =1 |
|---|---|---|---|---|---|---|---|---|---|---|---|
| | 0 | 1 | 2 | 3 | 4 | 5 | 6 | 7 | 8 | 9 | |
| 40% | | | 6 | 4 | | | 6 | | | 4 | Null |
| 50% | | | 6,7 | 4 | 4 | | 6 | | | | 5 |
| 60% | | | 6,7 | 4,5 | 4 | | 6 | | | | 5 |
| 70% | | | 6,7,11 | 4,5,6 | 4 | | | | | | 5,1 |
| 80% | | | 6,7,11,12 | 4,5,6,9 | | | | | | | 5,1,0 |
| 90% | | | 6,7,11,12,13,9,5,4 | | | | | | | | 5,1,0,3,4,7,8,9 |

SIB1 Configuration: Configuration 0

Subframe index with "TIF =1" in DCI format for DL grant if transmitted

FIG. 11B

Decreasing ↕

| UL Ratio | subframe number n | | | | | | | | | | TIF =1 |
|---|---|---|---|---|---|---|---|---|---|---|---|
| | 0 | 1 | 2 | 3 | 4 | 5 | 6 | 7 | 8 | 9 | |
| 10% | | | | | | | | | 4 | | 0,6 |
| 20% | | | | | | | 6 | | 4 | | 0,6 |
| 30% | 4 | | | | | | 6 | | 4 | | 0 |
| 40% | 4 | | | | | 4 | 6 | | | | 0 |
| 50% | 4 | 6 | | | | 4 | 6 | | | 4 | 1 |
| 60% | 4 | 6 | | | | 4 | 6 | | | | Null |

SIB1 Configuration: Configuration 0

FIG. 11C

Decreasing ↕

| UL Ratio | subframe number n | | | | | | | | | | TIF =1 |
|---|---|---|---|---|---|---|---|---|---|---|---|
| | 0 | 1 | 2 | 3 | 4 | 5 | 6 | 7 | 8 | 9 | |
| 10% | | | 4 | | | | | | | | 0,6 |
| 20% | | | 4 | 5 | | | | | | | 0,6 |
| 30% | | | 4 | 7 | 4 | | | | | | 0 |
| 40% | | | 4 | 7 | 6 | | | 8 | | | 0 |
| 50% | | | 4 | 7 | 6 | | | 4 | 7 | | 1 |
| 60% | | | 4 | 7 | 6 | | | 4 | 7 | 6 | Null |

SIB1 Configuration: Configuration 0

| DL Ratio | subframe number n | | | | | | | | | | TIF =1 |
|---|---|---|---|---|---|---|---|---|---|---|---|
| | 0 | 1 | 2 | 3 | 4 | 5 | 6 | 7 | 8 | 9 | |
| 40% | | | 7,6 | | | | | 7,6 | | | Null |
| 50% | | | 7,6 | | | | | 8,7,6 | | | |
| 60% | | | 7,4,6 | | | | | 8,7,6,4 | | | |
| 70% | | | 7,4,6 | | | | | 8,7,6,4 | | | |
| 80% | | | 8,7,4,6 | | | | | | | | |
| 90% | | | 8,7,4,6,13,12,9,5,11 | | | | | | | | 9,0,1,3 |

Decreasing ↑ (40%–70%), Increasing ↓ (80%–90%)

SIB1 Configuration: Configuration 2

Subframe index with "TIF =1" in DCI format for DL grant if transmitted

FIG. 12A

| UL Ratio | subframe number n | | | | | | | | | | TIF =1 |
|---|---|---|---|---|---|---|---|---|---|---|---|
| | 0 | 1 | 2 | 3 | 4 | 5 | 6 | 7 | 8 | 9 | |
| 10% | | | | | | | | | 4 | | Null |
| 20% | | | | | 4 | | | | 4 | | |
| 30% | | | 6 | | | | | | 4 | 4 | 1 |
| 40% | 4 | | 6 | | | | | | 4 | 4 | |
| 50% | 4 | | 6 | | | | 6 | | | 4 | 1,6 |
| 60% | 4 | | 6 | | 4 | | 6 | | | | |

Decreasing ↑ (10%), Increasing ↓ (20%–60%)

SIB1 Configuration: Configuration 2

FIG. 12B

| UL Ratio | subframe number n | | | | | | | | | | TIF =1 |
|---|---|---|---|---|---|---|---|---|---|---|---|
| | 0 | 1 | 2 | 3 | 4 | 5 | 6 | 7 | 8 | 9 | |
| 10% | | | 6 | | | | | | | | Null |
| 20% | | | 6 | | | | | 6 | | | |
| 30% | | | 6 | 6 | | | | 4 | | | 1 |
| 40% | | | 6 | 6 | 6 | | | 4 | | | |
| 50% | | | 4 | 6 | 6 | | | 4 | 13 | | 1,6 |
| 60% | | | 4 | 13 | 6 | | | 4 | 13 | 6 | |

Decreasing ↑ (10%), Increasing ↓ (20%–60%)

SIB1 Configuration: Configuration 2

FIG. 12C

| DL Ratio | subframe number n | | | | | | | | | | TIF =1 |
|---|---|---|---|---|---|---|---|---|---|---|---|
| | 0 | 1 | 2 | 3 | 4 | 5 | 6 | 7 | 8 | 9 | |
| 40% | | | 7,6,11 | | 4 | | | | | | Null |
| 50% | | | 7,6,11 | | 5,4 | | | | | | Null |
| 60% | | | 7,6,11 | 5 | 5,4 | | | | | | Null |
| 70% | | | 7,6,11 | 6,5 | 5,4 | | | | | | Null |
| 80% | | | 7,6,11,13,12 | 6,5,9 | | | | | | | 0,9 |
| 90% | | | 7,6,11,13,12,8,9,5,4 | | | | | | | | 4,7,8, 0,9 |

Decreasing / Increasing

SIB1 Configuration: Configuration 3

Subframe index with "TIF =1" in DCI format for DL grant if transmitted

FIG. 13A

| UL Ratio | subframe number n | | | | | | | | | | TIF =1 |
|---|---|---|---|---|---|---|---|---|---|---|---|
| | 0 | 1 | 2 | 3 | 4 | 5 | 6 | 7 | 8 | 9 | |
| 10% | | | | | | | | | 4 | | Null |
| 20% | | | | | | | | | 4 | 4 | Null |
| 30% | 4 | | | | | | | | 4 | 4 | Null |
| 40% | 4 | 6 | | | | | | | 4 | 4 | |
| 50% | 4 | 6 | | | | | 6 | | | 4 | |
| 60% | 4 | 6 | | | 4 | | 6 | | | | 6 |

SIB1 Configuration: Configuration 3

FIG. 13B

| UL Ratio | subframe number n | | | | | | | | | | TIF =1 |
|---|---|---|---|---|---|---|---|---|---|---|---|
| | 0 | 1 | 2 | 3 | 4 | 5 | 6 | 7 | 8 | 9 | |
| 10% | | | 6 | | | | | | | | Null |
| 20% | | | 6 | 6 | | | | | | | Null |
| 30% | | | 6 | 6 | 6 | | | | | | Null |
| 40% | | | 6 | 6 | 6 | | | 4 | | | |
| 50% | | | 4 | 6 | 6 | | | 4 | 13 | | 6 |
| 60% | | | 4 | 13 | 6 | | | 4 | 13 | 6 | 6 |

SIB1 Configuration: Configuration 3

FIG. 13C

| DL Ratio | subframe number *n* | | | | | | | | | | TIF =1 |
|---|---|---|---|---|---|---|---|---|---|---|---|
| | 0 | 1 | 2 | 3 | 4 | 5 | 6 | 7 | 8 | 9 | |
| 40% | | | 12,7,11 | 7 | | | | | | | Null |
| 50% | | | 12,7,11 | 4,7 | | | | | | | |
| 60% | | | 12,7,11 | 5,4,7 | | | | | | | |
| 70% | | | 12,7,11 | 6,5,4,7 | | | | | | | |
| 80% | | | 12,8,7,11 | 6,5,4,7 | | | | | | | |
| 90% | | | 12,8,7,11,13,9,5,4,6 | | | | | | | | 9,6,7,8 |

Decreasing ↑ (40%–70%), Increasing ↓ (80%–90%)

SIB1 Configuration: Configuration 4

Subframe index with "TIF =1" in DCI format for DL grant if transmitted

FIG. 14A

| UL Ratio | subframe number *n* | | | | | | | | | | TIF =1 |
|---|---|---|---|---|---|---|---|---|---|---|---|
| | 0 | 1 | 2 | 3 | 4 | 5 | 6 | 7 | 8 | 9 | |
| 10% | | | | | | | | | 4 | | Null |
| 20% | | | | | | | | | 4 | 4 | |
| 30% | 4 | | | | | | | | 4 | 4 | |
| 40% | 4 | 6 | | | | | | | 4 | 4 | |
| 50% | 4 | 6 | | | | | 6 | | 4 | | 6 |
| 60% | 4 | 6 | | | 4 | | 6 | | | | |

Decreasing ↑ (10%–20%), Increasing ↓ (30%–60%)

SIB1 Configuration: Configuration 4

FIG. 14B

| UL Ratio | subframe number *n* | | | | | | | | | | TIF =1 |
|---|---|---|---|---|---|---|---|---|---|---|---|
| | 0 | 1 | 2 | 3 | 4 | 5 | 6 | 7 | 8 | 9 | |
| 10% | | | 6 | | | | | | | | Null |
| 20% | | | 6 | 6 | | | | | | | |
| 30% | | | 6 | 6 | 6 | | | | | | |
| 40% | | | 6 | 6 | 6 | | | 4 | | | |
| 50% | | | 4 | 6 | 6 | | | 4 | 13 | | 6 |
| 60% | | | 4 | 13 | 6 | | | 4 | 13 | 6 | |

Decreasing ↑ (10%–20%), Increasing ↓ (30%–60%)

SIB1 Configuration: Configuration 4

FIG. 14C

| DL Ratio | subframe number *n* | | | | | | | | | | TIF =1 |
|---|---|---|---|---|---|---|---|---|---|---|---|
| | 0 | 1 | 2 | 3 | 4 | 5 | 6 | 7 | 8 | 9 | |
| 40% | | | 6 | | 4 | | | 6 | | 4 | 9,0,1,5 |
| 50% | | | 7,6 | 4 | 4 | | | 6 | | | 9,0,1 |
| 60% | | | 7,6,4 | 4 | 4 | | | 6 | | | 9,0 |
| 70% | | | 11,7,6,5,4 | 4 | 4 | | | | | | 9,0 |
| 80% | | | 12,11,8,7,6,5,4 | 4 | | | | | | | 9 |
| 90% | | | 13,12,9,8,7,5,4,11,6 | | | | | | | | Null |

Decreasing

SIB1 Configuration: Configuration 5

Subframe index with "TIF =1" in DCI format for DL grant if transmitted

FIG. 15A

| UL Ratio | subframe number *n* | | | | | | | | | | TIF =1 |
|---|---|---|---|---|---|---|---|---|---|---|---|
| | 0 | 1 | 2 | 3 | 4 | 5 | 6 | 7 | 8 | 9 | |
| 10% | | | | | | | | | 4 | | |
| 20% | | | | | | | | | 4 | 4 | |
| 30% | 4 | | | | | | | | 4 | 4 | Null |
| 40% | 4 | 6 | | | | | | | 4 | 4 | |
| 50% | 4 | 6 | | | | | 6 | | | 4 | |
| 60% | 4 | 6 | | | 4 | 6 | | | | | |

Increasing

SIB1 Configuration: Configuration 5

FIG. 15B

| UL Ratio | subframe number *n* | | | | | | | | | | TIF =1 |
|---|---|---|---|---|---|---|---|---|---|---|---|
| | 0 | 1 | 2 | 3 | 4 | 5 | 6 | 7 | 8 | 9 | |
| 10% | | | 6 | | | | | | | | |
| 20% | | | 6 | 6 | | | | | | | |
| 30% | | | 6 | 6 | 6 | | | | | | Null |
| 40% | | | 6 | 6 | 6 | | | 4 | | | |
| 50% | | | 4 | 6 | 6 | | | 4 | 13 | | |
| 60% | | | 4 | 13 | 6 | | | 4 | 13 | 6 | |

Increasing

SIB1 Configuration: Configuration 5

FIG. 15C

| DL Ratio | subframe number n | | | | | | | | | | TIF =1 |
|---|---|---|---|---|---|---|---|---|---|---|---|
| | 0 | 1 | 2 | 3 | 4 | 5 | 6 | 7 | 8 | 9 | |
| 40% | | | 7 | 7 | | | | 7 | 7 | | Null |
| 50% | | | 7 | 7 | 5 | | | 7 | 7 | | Null |
| 60% | | | 7,11 | 7,5 | 5 | | | 7 | | | 1 |
| 70% | | | 7,11,12 | 7,5,6 | | | | | | | 1,0 |
| 80% | | | 7,11,12,13 | 7,5,6,9 | | | | | | | 0,1,9 |
| 90% | | | 7,11,12,13,9,8,6,5,4 | | | | | | | | 0,1,9,4, 6,7,8 |

Decreasing ↑ (40%, 50%)
Increasing ↓ (60%–90%)

SIB1 Configuration: Configuration 6

Subframe index with "TIF =1" in DCI format for DL grant if transmitted

FIG. 16A

| UL Ratio | subframe number n | | | | | | | | | | TIF =1 |
|---|---|---|---|---|---|---|---|---|---|---|---|
| | 0 | 1 | 2 | 3 | 4 | 5 | 6 | 7 | 8 | 9 | |
| 10% | | | | | | | | | 4 | | Null |
| 20% | | | | | | | | 7 | 4 | | Null |
| 30% | | | | | | | | 7 | 4 | 5 | Null |
| 40% | 7 | | | | | | 7 | 7 | 4 | 5 | Null |
| 50% | 7 | 7 | | | | | 7 | 7 | | 5 | Null |
| 60% | 7,4 | 7 | | | | | | 7 | 7 | | Null |

Decreasing ↑ (10%–40%)
Increasing ↓ (50%, 60%)

SIB1 Configuration: Configuration 6

FIG. 16B

| UL Ratio | subframe number n | | | | | | | | | | TIF =1 |
|---|---|---|---|---|---|---|---|---|---|---|---|
| | 0 | 1 | 2 | 3 | 4 | 5 | 6 | 7 | 8 | 9 | |
| 10% | | | 6 | | | | | | | | Null |
| 20% | | | 4 | 5 | | | | | | | Null |
| 30% | | | 4 | 6 | 4 | | | | | | Null |
| 40% | | | 4 | 6 | 6 | | | | 8 | | Null |
| 50% | | | 4 | 6 | 6 | | | 4 | 7 | | Null |
| 60% | | | 4 | 7 | 6 | | | 4 | 7 | 6 | Null |

Decreasing ↑ (10%–40%)
Increasing ↓ (50%, 60%)

SIB1 Configuration: Configuration 6

FIG. 16C

SCHEDULING AND HYBRID AUTOMATIC REPEAT REQUEST (HARQ) TIMING INDICATION FOR AN UPLINK-DOWNLINK (UL-DL) RECONFIGURATION

RELATED APPLICATIONS

This application claims the benefit of and hereby incorporates by reference U.S. Provisional Patent Application Ser. No. 61/646,223, filed May 11, 2012.

BACKGROUND

Wireless mobile communication technology uses various standards and protocols to transmit data between a node (e.g., a transmission station or a transceiver node) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicate with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In homogeneous networks, the node, also called a macro node, can provide basic wireless coverage to wireless devices in a cell. The cell can be the area in which the wireless devices are operable to communicate with the macro node. Heterogeneous networks (HetNets) can be used to handle the increased traffic loads on the macro nodes due to increased usage and functionality of wireless devices. HetNets can include a layer of planned high power macro nodes (or macro-eNBs) overlaid with layers of lower power nodes (small-eNBs, micro-eNBs, pico-eNBs, femto-eNBs, or home eNBs [HeNBs]) that can be deployed in a less well planned or even entirely uncoordinated manner within the coverage area (cell) of a macro node. The lower power nodes (LPNs) can generally be referred to as "low power nodes", small nodes, or small cells.

The macro node can be used for basic coverage. The low power nodes can be used to fill coverage holes, to improve capacity in hot-zones or at the boundaries between the macro nodes' coverage areas, and improve indoor coverage where building structures impede signal transmission. Inter-cell interference coordination (ICIC) or enhanced ICIC (eICIC) may be used for resource coordination to reduce interference between the nodes, such as macro nodes and low power nodes in a HetNet.

Homogeneous networks or HetNets can use time-division duplexing (TDD) or frequency-division duplexing (FDD) for DL or UL transmissions. Time-division duplexing (TDD) is an application of time-division multiplexing (TDM) to separate downlink and uplink signals. In TDD, downlink signals and uplink signals may be carried on a same carrier frequency where the downlink signals use a different time interval from the uplink signals, so the downlink signals and the uplink signals do not generate interference for each other. TDM is a type of digital multiplexing in which two or more bit streams or signals, such as a downlink or uplink, are transferred apparently simultaneously as sub-channels in one communication channel, but are physically transmitted on different resources. In frequency-division duplexing (FDD), an uplink transmission and a downlink transmission can operate using different frequency carriers. In FDD, interference can be avoided because the downlink signals use a different frequency carrier from the uplink signals.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 8A illustrates a table (Table 6) for dynamic hybrid automatic repeat request (HARQ) timing with a downlink association set index using a timing indication field (TIF) value for a legacy long term evolution (LTE) uplink-downlink (UL-DL) time-division duplexing (TDD) configuration 1 in accordance with an example;

FIG. 8B illustrates a table (Table 7) for physical uplink shared channel (PUSCH) scheduling timing indication with a timing indication field (TIF) for a legacy long term evolution (LTE) uplink-downlink (UL-DL) time-division duplexing (TDD) configuration 1 in accordance with an example;

FIG. 8C illustrates a table (Table 8) for physical uplink shared channel (PUSCH) hybrid automatic repeat request (HARQ) timing indication with a timing indication field (TIF) for a legacy long term evolution (LTE) uplink-downlink (UL-DL) time-division duplexing (TDD) configuration 1 in accordance with an example;

FIG. 11A illustrates a table (Table 9) for dynamic HARQ timing with a downlink association set index using a TIF value for a legacy LTE UL-DL TDD configuration 0 in accordance with an example;

FIG. 11B illustrates a table (Table 10) for PUSCH scheduling timing indication with a TIF for a legacy LTE UL-DL TDD configuration 0 in accordance with an example;

FIG. 11C illustrates a table (Table 11) for PUSCH HARQ timing indication with a TIF for a legacy LTE UL-DL TDD configuration 0 in accordance with an example;

FIG. 12A illustrates a table (Table 12) for dynamic HARQ timing with a downlink association set index using a TIF value for a legacy LTE UL-DL TDD configuration 2 in accordance with an example;

FIG. 12B illustrates a table (Table 13) for PUSCH scheduling timing indication with a TIF for a legacy LTE UL-DL TDD configuration 2 in accordance with an example;

FIG. 12C illustrates a table (Table 14) for PUSCH HARQ timing indication with a TIF for a legacy LTE UL-DL TDD configuration 2 in accordance with an example;

FIG. 13A illustrates a table (Table 15) for dynamic HARQ timing with a downlink association set index using a TIF value for a legacy LTE UL-DL TDD configuration 3 in accordance with an example;

FIG. 13B illustrates a table (Table 16) for PUSCH scheduling timing indication with a TIF for a legacy LTE UL-DL TDD configuration 3 in accordance with an example;

FIG. 13C illustrates a table (Table 17) for PUSCH HARQ timing indication with a TIF for a legacy LTE UL-DL TDD configuration 3 in accordance with an example;

FIG. 14A illustrates a table (Table 18) for dynamic HARQ timing with a downlink association set index using a TIF value for a legacy LTE UL-DL TDD configuration 4 in accordance with an example;

FIG. 14B illustrates a table (Table 19) for PUSCH scheduling timing indication with a TIF for a legacy LTE UL-DL TDD configuration 4 in accordance with an example;

FIG. 14C illustrates a table (Table 20) for PUSCH HARQ timing indication with a TIF for a legacy LTE UL-DL TDD configuration 4 in accordance with an example;

FIG. 15A illustrates a table (Table 21) for dynamic HARQ timing with a downlink association set index using a TIF value for a legacy LTE UL-DL TDD configuration 5 in accordance with an example;

FIG. 15B illustrates a table (Table 22) for PUSCH scheduling timing indication with a TIF for a legacy LTE UL-DL TDD configuration 5 in accordance with an example;

FIG. 15C illustrates a table (Table 23) for PUSCH HARQ timing indication with a TIF for a legacy LTE UL-DL TDD configuration 5 in accordance with an example;

FIG. 16A illustrates a table (Table 24) for dynamic HARQ timing with a downlink association set index using a TIF value for a legacy LTE UL-DL TDD configuration 6 in accordance with an example;

FIG. 16B illustrates a table (Table 25) for PUSCH scheduling timing indication with a TIF for a legacy LTE UL-DL TDD configuration 6 in accordance with an example;

FIG. 16C illustrates a table (Table 26) for PUSCH HARQ timing indication with a TIF for a legacy LTE UL-DL TDD configuration 6 in accordance with an example;

Figure 1:
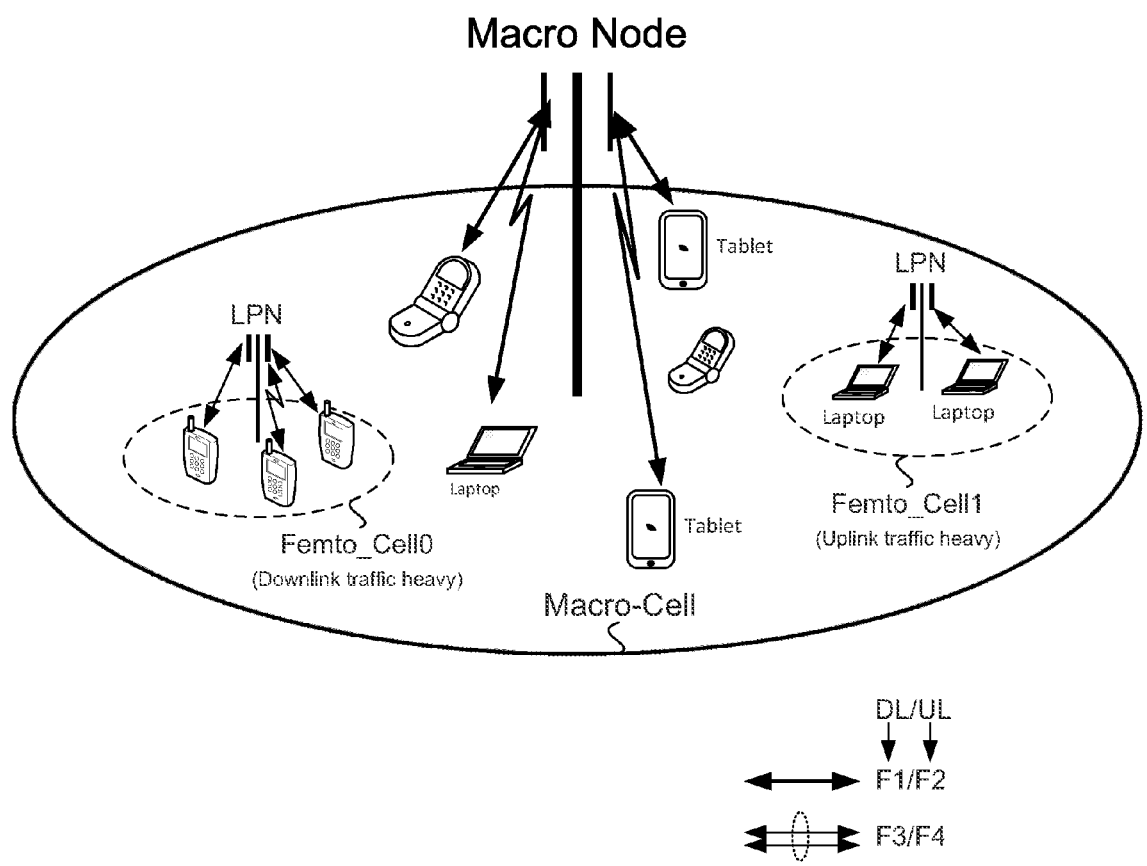
FIG. 1 illustrates a diagram of dynamic uplink-downlink (UL-DL) reconfiguration usage in a time-division duplexing (TDD) system in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Time division duplex (TDD) can offer flexible deployments without using a pair of spectrum resources. For TDD deployments, interference between uplink (UL) and downlink (DL) transmission including both base station-to-base station (BS-to-BS) interference and UE-to-UE interference can be considered when different uplink-downlink (UL-DL) configurations are used among cells in a network.

FIG. 1 illustrates a layered HetNet deployment with different node transmission powers using time-division duplexing (TDD). A node transmission power can refer to the power generated by a node type, such as a macro node (e.g., macro evolved Node B (eNB)) in a macro cell and multiple low power nodes (LPNs or small eNBs) in the respective small cells. As used herein, a cell can refer to the node or the coverage area of the node. The macro nodes can transmit at high power level, for example, approximately 5 watts (W) to 40 W, to cover the macro cell. The HetNet can be overlaid with low power nodes (LPNs), which may transmit at substantially lower power levels, such as approximately 100 milliwatts (mW) to 2 W. In an example, an available transmission power of the macro node may be at least ten times an available transmission power of the low power node. A LPN can be used in hot spots or hot-zones, referring to areas with a high wireless traffic load or high volume of actively transmitting wireless devices (e.g., user equipments (UEs)). A LPN can be used in a microcell, a picocell, a femtocell, and/or home network. Femto_Cell0 illustrates downlink traffic heavy usage by the wireless devices (e.g., UEs) and Femto_Cell1 illustrates uplink traffic heavy usage by the wireless devices. In a FDD example, the macro cell can use frequency bands F1 for DL and F2 for UL, and femtocells can use frequency bands F3 for DL and F4 for UL. In a TDD example, frequency bands F1/F2 can be used for DL and UL by the macro cell and frequency bands F3/F4 can be used for DL and UL by the femtocells.

Allowing adaptive UL-DL configurations depending on traffic conditions in different cells can significantly improve the system performance in some examples. FIG. 1 illustrates an example where different UL-DL configurations can be considered in different cells. Networks (e.g., HetNets or homogeneous networks) can involve a same carrier or different carriers deployed by a single operator or different operators in the same band and employing either a same or different uplink-downlink (UL-DL) configurations. Different UL-DL configurations can be used in different cells of the network (e.g., HetNet), and different carriers deployed by different operators in the same band can be used employing either the same or different uplink-downlink configurations. Interference may include adjacent channel interference (when different carrier frequencies are used) as well as co-channel interference (when a same carrier frequency is used) such as remote node-to-node interference (or BS-to-BS interference or eNB-to-eNB interference).

Various radio access technologies (RAT), such as legacy LTE TDD Release 8, 9, or 10, and advance LTE TDD Release 11), can support asymmetric UL-DL allocations by providing seven different semi-statically configured uplink-downlink configurations (i.e., legacy UL-DL TDD configurations). A legacy UL-DL TDD configurations can refer to a UL-DL TDD configurations as described in LTE TDD Release 8, 9, or 10. Table 1 illustrates seven UL-DL configurations used in LTE, where "D" represents a downlink subframe, "S" represents a special subframe, and "U" represents an uplink subframe. In an example, the special subframe can operate or be treated as a downlink subframe.

TABLE 1

| Uplink-downlink configuration | Subframe number | | | | | | | | |
|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

As illustrated by Table 1, UL-DL configuration 0 can include 6 uplink subframes in subframes 2, 3, 4, 7, 8, and 9, and 4 downlink and special subframes in subframes 0, 1, 5, and 6; and UL-DL configuration 5 can include one uplink subframe in subframe 2, and 9 downlink and special subframes in subframes 0, 1, 3-9.

The legacy LTE UL-DL TDD set of configurations can provide DL subframes allocations in the range of 40% to 90%, and UL subframes allocations in the range of 10% to 60%, as shown in Table 1. A semi-static allocation, at any given time, may not match the instantaneous traffic situation. A mechanism for adapting UL-DL allocation can be based on the system information change procedure, where the UL and DL subframes allocation within a radio frame can be reconfigured through system information broadcast signaling (e.g., a system information block [SIB]). Hence, the UL-DL allocation once configured can be expected to vary semi-statically. With a mechanism based on the SIB, a minimum latency of approximately 640 milliseconds (ms) can be used for the reconfiguration.

Figures 2, 3, 4:
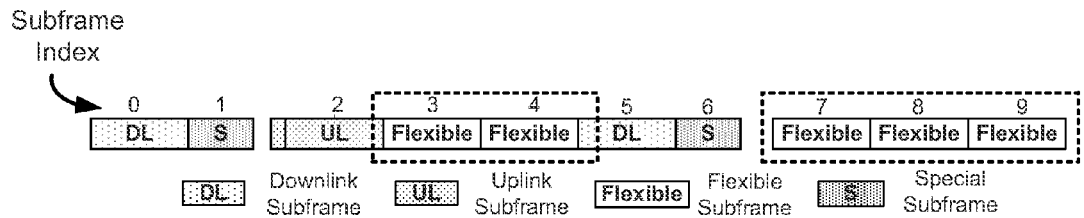
FIG. 2 illustrates a diagram of a legacy long term evolution (LTE) frame structure 2 (FS2) with flexible subframe (FlexSF) in accordance with an example.
FIG. 3 illustrates a table (Table 2) for hybrid automatic repeat request (HARQ) timing for a set of a legacy long term evolution (LTE) uplink-downlink (UL-DL) time-division duplexing (TDD) configurations in accordance with an example.
FIG. 4 illustrates an example abstract syntax notation one (ASN.1) code for a master information block (MIB) including a radio resource control (RRC) information element (IE) tdd-Config in accordance with an example.

Additional mechanisms can be used to support dynamic allocation of UL and DL subframes with a lower latency (e.g., 10 ms), such as "Flexible Subframes" (FlexSF), as shown in FIG. 2. A flexible subframe is capable of changing an uplink-downlink transmission direction for a set of legacy UL-DL TDD configurations. For example, subframes with a subframe index 3, 4, 7, 8, and 9 can vary between UL or DL subframes in the seven different semi-statically configured legacy LTE UL-DL TDD configurations. Subframes 0, 1, 2, 5, and 6 can be referred to as fixed subframes since the transmission direction can be fixed as primarily an UL subframe (e.g., subframe 2) or a DL subframe (e.g., DL subframes 0 and 5, special subframe 1, or DL or special subframe 6) for the seven different semi-statically configured legacy LTE UL-DL TDD configurations.

Advanced UEs supporting UL-DL TDD reconfiguration, can by default assume the FlexSF is a DL subframe and can attempt to decode physical downlink control channels (PDCCH) in FlexSFs unless explicitly instructed by the node (e.g., eNB) for a UL transmission. The FlexSFs can be transparent to legacy UEs, using LTE TDD Release 8, 9, or 10, and the UL or DL configuration of the FlexSFs can be changed semi-statically for legacy UEs through system information block type 1 (SIB1) information bits. The node can be responsible to properly schedule the data transmission of legacy UEs to ensure that the corresponding physical uplink shared channel (PUSCH) and hybrid automatic repeat request-acknowledgement (HARQ-ACK) resources of the physical downlink shared channel (PDSCH) and the PUSCH still are valid even when the TDD configuration is changed for advanced UE supporting FlexSFs.

A downlink signal or channel can include data on a Physical Downlink Shared CHannel (PDSCH) or control information on a Physical Downlink Control CHannel (PDCCH). A PDCCH can carry a message known as Downlink Control Information (DCI), which can includes transmission resource assignments, such as a PUSCH, and other control information for a UE or group of UEs. Many PDCCHs can be transmitted in a subframe. An uplink signal or channel can include data on a Physical Uplink Shared CHannel (PUSCH) or control information on a Physical Uplink Control CHannel (PUCCH). Automatic Repeat reQuest is a feedback mechanism whereby a receiving terminal requests retransmission of packets which are detected to be erroneous. Hybrid ARQ is a simultaneous combination of Automatic Retransmission reQuest (ARQ) and forward error correction (FEC) which can enables the overhead of error correction to be adapted dynamically depending on the channel quality. When HARQ is used and if the errors can be corrected by FEC then no retransmission may be requested, otherwise if the errors can be detected but not corrected, a retransmission can be requested. An ACKnowledgment (ACK) signal can be transmitted to indicate that one or more blocks of data, such as in a PDSCH, have been successfully received and decoded. HARQ-ACK/Negative ACKnowledgment (NACK or NAK) information can include feedback from a receiver to the transmitter in order to acknowledge a correct reception of a packet or ask for a new retransmission (via NACK or NAK). A PDSCH HARQ can be transmitted in an uplink subframe after a PDSCH in a downlink subframe, and a PUSCH HARQ can be transmitted in a downlink subframe after a PUSCH in an uplink subframe.

In legacy LTE, each of the seven semi-statically configured UL-DL TDD configurations can have PDSCH HARQ timings corresponding to UL subframes, and PUSCH scheduling timings and PUSCH HARQ timings corresponding to DL subframes. For example, Table 2 illustrates the PDSCH HARQ timing for seven UL-DL configurations used in LTE, as illustrated in FIG. 3. A PDSCH transmission can be indicated by the detection of corresponding PDCCH or a PDCCH indicating downlink SPS release within subframe(s) n−k, where k∈K and K defined in Table 2 (also shown in Table 10.1.3.1-1 3GPP technical specification (TS) 36.213 V11.0.0 (2012-09)) is a set of M elements $\{k_0, k_1, \ldots k_{M-1}\}$ depending on the subframe n. For instance, an uplink subframe n in Table 2 can be used to transmit PDSCH HARQ-ACK(s) for PDSCH in subframe(s) n−k.

For example in TDD configuration 1 indicated by the SIB1, a UL subframe 2 can provide a PDSCH HARQ-ACK for DL subframes 5 and 6 of a prior radio frame, a UL subframe 3 can provide a PDSCH HARQ-ACK for DL subframe 9 of the prior frame, UL subframe 7 can provide a PDSCH HARQ-ACK for DL subframes 0 and 1 of the prior frame, and UL subframe 8 can provide a PDSCH HARQ-ACK for DL subframe 4 of the prior frame. In an example, at least four subframes may occur between a downlink subframe and an uplink subframe to allow for transmission, decoding, and processing of the downlink transmission, PDCCH, and/or uplink transmission.

Table 3 illustrates the PUSCH scheduling timing for seven UL-DL configurations used in LTE. For UL-reference UL/DL configurations belonging to {1,2,3,4,5,6} and a normal HARQ operation, the UE can upon detection of a PDCCH or enhanced physical downlink control channels (EPDCCH or ePDCCH) with an uplink DCI format and/or a physical hybrid automatic repeat request (ARQ) indicator channel (PHICH) transmission in subframe n intended for the UE, adjust a corresponding PUSCH transmission in subframe n+k, with k given in Table 3 (also shown in Table 8-2 3GPP technical specification (TS) 36.213 V11.0.0 (2012-09)), according to the PDCCH/EPDCCH information and the PHICH information. Physical Hybrid ARQ Indicator CHannel (PHICH) is a downlink physical channel which carries the HARQ ACK/NACK information indicating whether the node has correctly received a transmission on the PUSCH. For UL-reference UL/DL configuration 0 and normal HARQ operation, a least significant bit (LSB) of the UL index in the DCI format 0/4 can be set to 1 in subframe n or a PHICH can be received in subframe n=0 or 5 in the resource corresponding to $I_{PHICH}=1$, or PHICH can be received in subframe n=1 or 6, the UE can adjust the corresponding PUSCH transmission in subframe n+7.

TABLE 3

| TDD UL/DL Configuration | \multicolumn{10}{c}{subframe number n} |
|---|---|---|---|---|---|---|---|---|---|---|
|  | 0 | 1 | 2 | 3 | 4 | 5 | 6 | 7 | 8 | 9 |
| 0 |   | 4 | 6 |   |   |   | 4 | 6 |   |   |
| 1 |   |   | 6 |   | 4 |   |   | 6 |   | 4 |
| 2 |   |   | 4 |   |   |   |   | 4 |   |   |
| 3 | 4 |   |   |   |   |   |   | 4 | 4 |   |
| 4 |   |   |   |   |   |   |   |   | 4 | 4 |
| 5 |   |   |   |   |   |   |   |   | 4 |   |
| 6 | 7 | 7 |   |   |   | 7 | 7 |   |   | 5 |

For example in TDD configuration 1 indicated by the SIB1, a DL subframe 1 can schedule a PUSCH in a UL subframe 7, a DL subframe 4 can schedule a PUSCH in a UL subframe 8, a DL subframe 6 can schedule a PUSCH in a UL subframe 2 of a subsequent radio frame, and a DL subframe 9 can schedule a PUSCH in UL subframe 3 of a subsequent frame. In an example, at least four subframes may occur between a downlink subframe and an uplink subframe to allow for transmission, decoding, and processing of the downlink transmission, PDCCH, and/or uplink transmission.

Table 4 illustrates the PUSCH HARQ timing for seven UL-DL configurations used in LTE. For PUSCH transmissions scheduled from serving cell c in subframe n, a UE can determine the corresponding PHICH resource of a serving cell c in subframe $n+k_{PHICH}$, where $k_{PHICH}$ is given in Table 4 (also shown in Table 9.1.2-1 3GPP technical specification (TS) 36.213 V11.0.0 (2012-09)).

TABLE 4

| TDD UL/DL Configuration | \multicolumn{10}{c}{subframe index n} |
|---|---|---|---|---|---|---|---|---|---|---|
|  | 0 | 1 | 2 | 3 | 4 | 5 | 6 | 7 | 8 | 9 |
| 0 |   |   | 4 | 7 | 6 |   |   | 4 | 7 | 6 |
| 1 |   |   | 4 | 6 |   |   |   | 4 | 6 |   |
| 2 |   |   | 6 |   |   |   |   | 6 |   |   |
| 3 |   |   | 6 | 6 | 6 |   |   |   |   |   |
| 4 |   |   | 6 | 6 |   |   |   |   |   |   |
| 5 |   |   | 6 |   |   |   |   |   |   |   |
| 6 |   |   | 4 | 6 | 6 |   |   | 4 | 7 |   |

For example in TDD configuration 0 indicated by the SIB1, a PUSCH HARQ-ACK for a UL subframe 2 can be transmitted in a DL subframe 6, a PUSCH HARQ-ACK for a UL subframe 3 can be transmitted in a DL subframe 9, a PUSCH HARQ-ACK for a UL subframe 7 can be transmitted in a DL subframe 1 of a subsequent radio frame, and a PUSCH HARQ-ACK for a UL subframe 8 can be transmitted in a DL subframe 4 of a subsequent frame. In an example, at least four subframes may occur between an uplink subframe and a downlink subframe to allow for decoding and processing of the downlink transmission, uplink transmission, and/or PHICH.

A change in the dynamically configured transmission direction of FlexSFs can change the PDSCH HARQ timings corresponding to UL subframes, and PUSCH scheduling timings and PUSCH HARQ timings corresponding to DL subframes. When the dynamically configured transmission direction of FlexSFs are different with a default configuration as indicated by SIB1, the FlexSFs may not be used and/or scheduled for legacy UEs. Advanced UEs may enable the node to dynamically configure the FlexSFs to match the UL-DL configuration with the instantaneous traffic situation effectively. The FlexSFs with a dynamically configured transmission direction can be efficiently utilized by advanced UEs while maintaining a proper HARQ-ACK feedback with a predefined HARQ timeline linked and/or corresponding to the configured UL-DL configurations. Some dynamic configurations can have backward compatibility to ensure measurement accuracy of legacy UEs.

For an advance TD-LTE system, a UL-DL reconfiguration indication mechanism (e.g., timing indication field (TIF)) can be used to inform advanced UEs of a latest transmission direction of FlexSFs in a timely manner while minimizing control overhead, which can satisfy an instantaneous traffic situation and maintain a backward compatibility with legacy UEs. Various alternatives for UL-DL reconfiguration and associated PDSCH scheduling and/or HARQ timing indications can be used while still providing backward compatibility with legacy UEs.

At least two alternatives can be used to indicate UL-DL TDD reconfigurations, which can enable a fully flexible UL-DL ratio reconfiguration within predefined UL-DL configurations while avoiding and/or reducing impacts on legacy UEs. The at least two alternatives may be classified based on a content of signaling involved. For example, the alternatives can used a HARQ and/or scheduling timing indication, or a predefined subframe order to support transmissible direction changing both in the DL and the UL.

In a configuration (i.e., option 1), three sparse bits of an existing ten sparse bits reserved in the master information block (MIB) radio resource control (RRC) signaling can be used to explicitly indicate the latest UL-DL configuration.

FIG. 4 illustrates an example abstract syntax notation one (ASN.1) code for a master information block (MIB) including a radio resource control (RRC) information element (IE) tdd-Config to indicate a UL-DL configuration. The explicit configuration indication of the latest UL-DL configuration via RRC signaling can modify the operation of the UE (e.g., advanced UE). Since in LTE systems, only some essential parameters are transmitted in MIB for a UE's initial access to the network, the UE may not read the MIB frequently. For instance, the UE may read the MIB once for the UE's initial access, and the UE may read the MIB again during the session. As a result, incorporating a latest UL-DL configuration into existing MIB information can lead to an overall reconfiguration latency that is much larger than 40 ms. Changing a UE behavior, such as increasing a frequency of MIB decoding can reduce the latency, but may increase a UE's power consumption due to frequent MIB decoding.

Figure 5:
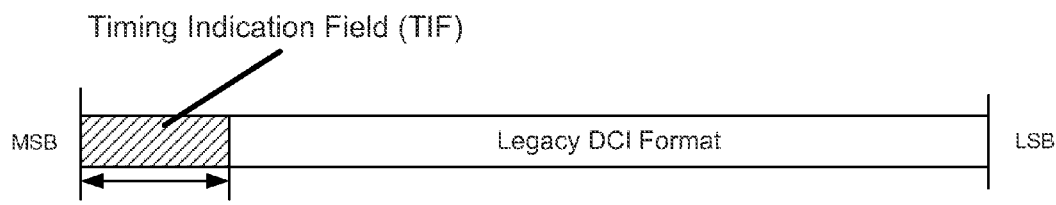
FIG. 5 illustrates a diagram of a downlink control information (DCI) format including a timing indication field (TIF) in accordance with an example.

In another configuration (i.e., option 2), a downlink control field, referred to as 'Timing Indication Field' (TIF), can be added to an existing downlink control information (DCI) format to indicate a scheduling and/or HARQ timing directly, as shown in FIG. 5. The TIF field can be of a fixed length and may be conditionally padded to a legacy DCI in a UE-specific search space (USS), and the DCI may not be located in a common search space (CSS) to avoid or reduce backward compatibility issues.

Option 2 allows each UL-DL configuration to be associated with a particular set of scheduling and/or HARQ timing relationships. The TIF can be sufficient to directly indicate to the UE a predefined scheduling and/or HARQ timing corresponding to each UL-DL configuration in set of UL-DL configurations (e.g., legacy LTE UL-DL TDD configurations) using modified DCI formats, as shown in FIG. 5, instead of explicitly signaling of a latest UL-DL configuration. Using option 2, the TIF may not indicate the UL-DL configuration, so the latest UL-DL configuration can still be unknown to the UE. Because the TIF used in option 2 is based on layer 1 (physical or PHY layer) signaling, small reconfiguration timescales, such as 10 ms latencies, can be supported with an increase in the additional downlink control overhead, as shown in FIG. 5.

Option 2 can be implemented using at least two different sizes of the TIF corresponding to different signaling overhead. For example, the TIF can use 3-bits (i.e., option 2, alternative 1) or 1 bit (i.e., option 2, alternative 2).

For the 3-bit TIF case, a direct one-to-one mapping between TIF states and the predefined UL-DL configuration, such as the seven legacy TDD UL-DL configurations, can be used. DL control overhead with 3-bit may be significant, so some TIF field compression, such as using the 1-bit TIF, can reduce control overhead and can improve the signaling efficiency for the dynamic reconfiguration. A timing indication method can be used with the 3-bit TIF or the 1-bit TIF padding and still support very fast (e.g., 10 ms timescale) TDD UL-DL reconfigurations. For illustration, alternative 2 is described, but the same principles can be applied to a greater number of bits used for the TIF.

For alternative 2, two scheduling and/or HARQ timing relationships (e.g., timing candidates) can be predefined corresponding to each SIB1 TDD configuration. The 1-bit TIF can indicate the scheduling and/or HARQ timing selected by the node between the two timing candidates, as shown in Table 5. Table 5 illustrates a usage of a 1-bit TIF.

TABLE 5

| TIF value | Scheduling/HARQ timing for SIB1 configuration X |
|---|---|
| 0 | Timing relationship 0 ($T_0$) |
| 1 | Timing relationship 1 ($T_1$) |

Both of the two scheduling and/or HARQ timings can be selected from existing predefined timing relationships in a legacy system, which can reduce an implementation and/or specification complexity. The two scheduling and/or HARQ timings relationships can be predefined at both the node (e.g., eNB) and the wireless device (e.g., UE), such as in a table or mapping.

The following provides additional details of the examples, including detailed descriptions on alternative 2 corresponding to the seven legacy UL-DL configurations. Because the flexible subframes (FlexSF) can switch between UL and DL transmissions from frame to frame, the UE can attempt to decode PDCCH for the DCI on flexible subframes, such as subframe 3, 4, 7, 8, and 9, as illustrated in FIG. 2, unless the UE is explicitly instructed by the node to transmit in uplink for PUCCH or PUSCH.

Figure 6:
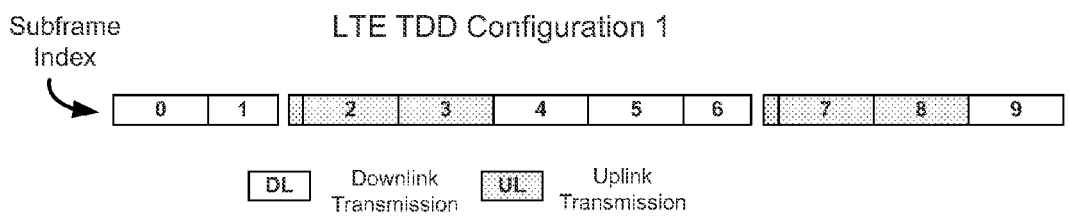
FIG. 6 illustrates a diagram of a frame structure for a legacy long term evolution (LTE) uplink-downlink (UL-DL) time-division duplexing (TDD) configuration 1 in accordance with an example.

FIG. 6 illustrates a TDD configuration in SIB1 as LTE TDD configuration 1 (i.e., case 0), which configuration is used to illustrate the predefined scheduling and/or HARQ timing relationships for dynamic reconfiguration using the 1-bit TIF. Although, LTE TDD configuration 1 is illustrated the same principles can apply to the other LTE TDD configurations. For UEs supporting adaptive UL-DL TDD configurations, the UEs can check a defined TIF in DL/UL scheduling grants on flexible subframes first, if no explicit uplink transmission has already been scheduled. Then, depending on the TIF value detected, the UE can determine which of the subsequent flexible subframes are used for UL/DL transmissions.

First, the predefined PDSCH HARQ timing relationships for the dynamic reconfiguration is described, where the PDSCH HARQ is transmitted on uplink subframes. Then, the predefined PUSCH scheduling and PUSCH HARQ timing relationships for dynamic reconfiguration is described, where the PUSCH scheduling and PUSCH HARQ are transmitted on downlink subframes.

For the PDSCH HARQ timing case (e.g., PDSCH HARQ timing indication), the PDSCH HARQ timing can vary on whether the DL ratio is increasing or decreasing with the new reconfiguration. Both cases of an increasing number of DL subframes or decreasing number of DL subframes in the radio frame relative to the TDD configuration in SIB1 is described. The DL ratio is the number of subframes in the radio frame configured for DL transmissions relative to the total number of subframes of the radio frame. For the seven legacy UL-DL configurations, the DL ratio can range from 40% (e.g., LTE TDD configuration 0) to 90% (e.g., LTE TDD configuration 5). Similarly, an UL ratio is the number of subframes in the radio frame configured for UL transmissions relative to the total number of subframes of the radio frame. For the seven legacy UL-DL configurations, the UL ratio can range from 10% (e.g., LTE TDD configuration 5) to 60% (e.g., LTE TDD configuration 0).

Figure 7:
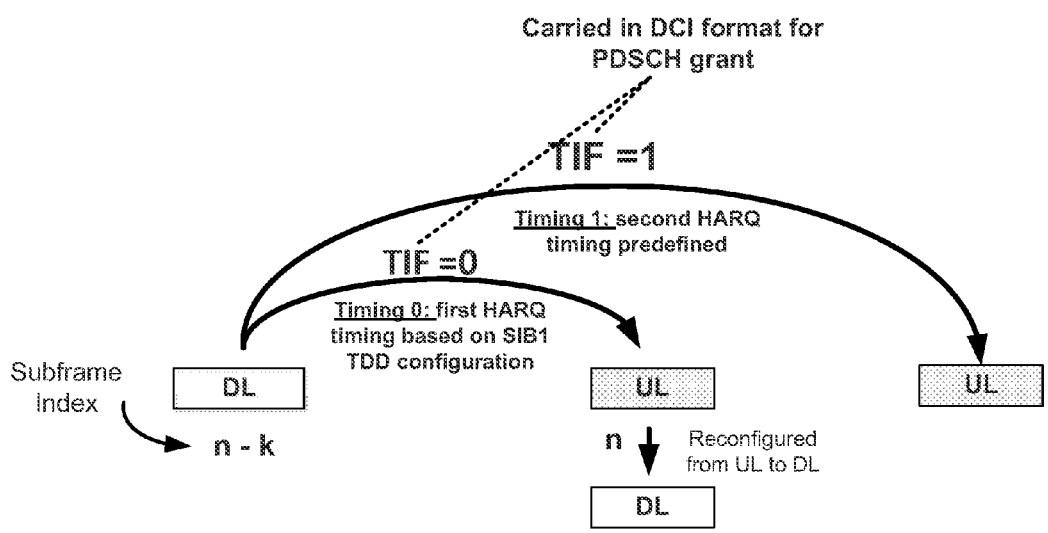
FIG. 7 illustrates a diagram for a dynamic hybrid automatic repeat request (HARQ) timing indication using a timing indication field (TIF) field in accordance with an example.

For the case when the DL ratio decreases with reconfiguration, no UL ACK/NACK (A/N) transmission may be used for the PDSCH HARQ at the FlexSF, which can support backward compatibility. But, if the DL subframe ratio increases, another HARQ timing, which is different from the timing used for the TDD configuration in SIB1, can be signaled via the TIF, as shown in FIG. 7. FIG. 7 illustrates a flexible subframe n reconfigured from a UL subframe to a downlink subframe. When the flexible subframe n used to transmit a PDSCH HARQ for downlink subframe n−k (for the TDD configuration in SIB1) is reconfigured from the UL subframe to a downlink subframe, flexible subframe n may no longer be available for a PDSCH A/N transmission for downlink subframe n−k. So, another available uplink subframe can be used to transmit the A/N for the PDSCH, which can have a second predefined HARQ timing relationship (e.g., timing 1) indicated by TIF=1. TIF=0 can be used to indicate a first predefined HARQ timing relationship (e.g., timing 2) based on the TDD configuration on SIB1. The TIF value can be carried in a DCI format for a PDSCH grant.

In an example, Table 6, as illustrated in FIG. 8A, summarizes UL HARQ timings corresponding to PDSCH within subframe(s) n−k, where k∈K and K is a set of M elements $\{k_0, k_1, \ldots, k_{M-1}\}$, by incorporating two distinct HARQ timing for each DL subframe for a LTE TDD configuration 1. For example, when the DL ratio decreases, subframe n is still available for the UL HARQ for PDSCH of subframe n−k, thus the UE can use the existing legacy PDSCH HARQ timing relationship indicated by TIF=0 (e.g., TIF null). When the DL ratio increases, subframe n may not be available for the UL HARQ for PDSCH of subframe n−k, thus the UE can use a second PDSCH HARQ timing relationship indicated by TIF=1. For instance, when the TIF value for subframes 4, 9, and 8 equal 1 (and the TIF value for subframes 0, 1, 3, 5, 6 equals zero), indicating a reconfiguration from a 60% DL ratio to a 80% DL ratio, subframe 2 can provide the UL HARQ for subframes 5, 6, 4, 8 of the previous frame and subframe 9 from two frames earlier corresponding to k∈{7,6, 8,13,4}, and subframe 7 can provide the UL HARQ for subframes 0, 1, and 3 of the same frame corresponding to k∈{7, 6,4}. When the TIF value for the DL subframes and FlexSFs equal 0 (e.g., subframes 0, 1, 3, 4, 5, 6, 7, 8, and 9), indicating no reconfiguration (e.g., maintain a 60% DL ratio), the subframe 2 can provide the UL HARQ for subframes 5 and 6 of the previous frame corresponding to k∈{7,6}, the subframe 3 can provide the UL HARQ for subframe 9 of the previous frame corresponding to k∈{4}, the subframe 7 can provide the UL HARQ for subframes 0 and 1 of the same frame corresponding to k∈{7,6}, and the subframe 8 can provide the UL HARQ for subframe 4 of the same frame corresponding to k∈{4}. The underlining and bolding of the k values and the TIF=1 values can indicate a change in configuration from the next increment of the DL ratio.

Figure 9:
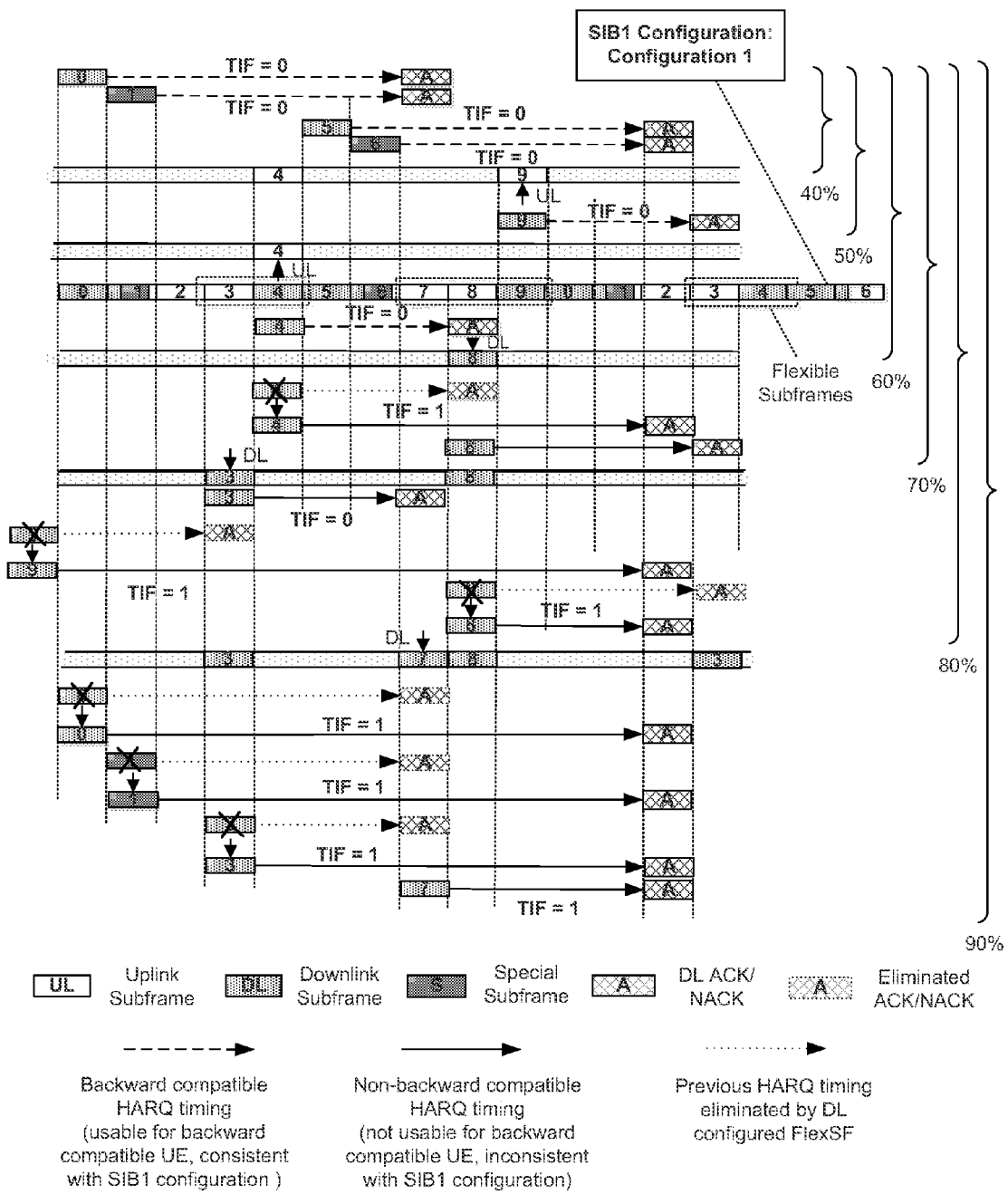
FIG. 9 illustrates a diagram for a physical downlink shared channel (PDSCH) hybrid automatic repeat request (HARQ) timing indication with a timing indication field (TIF) field for a legacy long term evolution (LTE) uplink-downlink (UL-DL) time-division duplexing (TDD) configuration 1 in accordance with an example.

FIG. 9 illustrates a detailed PDSCH HARQ signaling method with TIFs by considering reconfigurations from TDD configuration 1 to TDD configurations with different DL subframe ratios (e.g., 40-90%). For example, the TDD configuration 1 with a dynamic 40-60% DL ratio using TIF=0 can have backward compatible HARQ timing consistent with a legacy SIB1 configuration. The TDD configuration 1 with a dynamic 70-90% DL ratio using TIF=1 may not have a backward compatible HARQ timing consistent with a legacy SIB1 configuration.

In FIG. 9, the "x" over the subframe carrying the PDSCH indicates the UL HARQ timing corresponding to PDSCH is eliminated by a reconfigured from a UL subframe to a DL subframe. For instance with an 80% DL ratio reconfiguration (e.g. DL ratio changing from 70% to 80%), subframes 9 and 8 carrying the PDSCH can no longer transmit the A/N on subframe 3 (i.e., a UL subframe converted to DL subframe). Instead, subframe 9 transmits the A/N on subframe 2 on a radio frame after a next radio frame (i.e., an available UL subframe at least 4 subframes from the subframe 9), which is indicated by TIF=1 in subframe 9, and subframe 8 transmits the A/N on subframe 3 of a next radio frame (i.e., an available UL subframe at least 4 subframes from the subframe 8), which is indicated by TIF=1 in subframe 8. For subframe 9, TIF=0 represents k=4 (in subframe 3), or TIF=1 represents k=13 (in subframe 2), which can be represented as (9, 4, 13) for a value $(n,k_0,k_1)$ for the DL subframe n. For subframe 9, TIF=0 can share a similar timing relationship with legacy UL-DL configurations 1 and 4. For subframe 8, TIF=0 represents k=5 (in subframe 3), or TIF=1 represents k=4 (in subframe 2), which can be represented as (8, 5, 4) for a value $(n,k_0,k_1)$ for the DL subframe n. For subframe 8, TIF=0 can share a similar timing relationship with legacy UL-DL configurations 3 and 4. Subframe 4 transmits the A/N on subframe 2 of next radio frame (i.e., an available UL subframe at least 4 subframes from the subframe 4), which is indicated by TIF=1 in subframe 4, for DL ratio changing from 60% to 70% or greater. For subframe 4, TIF=0 represents k=4 (in subframe 8), or TIF=1 represents k=8 (in subframe 2), which can be represented as (4,4,8) for a value $(n,k_0,k_1)$ for the DL subframe n. For subframe 4, TIF=0 can share a similar timing relationship with legacy UL-DL configuration 1. The TIF value-k value relationship (e.g., TIF=0 or TIF=1) for each subframe can vary based on the SIB1 UL-DL configuration.

When a SIB1 UL-DL configuration is configuration 1 without dynamic reconfiguration (e.g., DL ratio of 60%), the UE may not detect the PDCCH on subframe 3 (i.e., configured as a UL subframe). For a SIB1 UL-DL configuration 1 with a 80% or higher DL ratio dynamic reconfiguration, subframe 3 can be configured as a DL subframe, and the UE can detect a DL grant on subframe 3 (i.e., UE can attempt to decode the PDCCH of each flexible subframe, unless the FlexSF is explicitly signaled to transmit in a UL). The PDSCH HARQ-ACK timing relationship for subframe 3 can be determined by a detected TIF value. If the TIF=0, HARQ-ACK for PDSCH in subframe 3 can be sent as feedback in the subframe 7 of the same radio frame (e.g., k=4 in subframe 7), and if TIF=1, HARQ-ACK for PDSCH in subframe 3 can be sent as feedback in subframe 2 of the next radio frame (e.g., k=9 in subframe 2), which can be represented as (3, 4, 9) for a value $(n,k_0,k_1)$ for the DL subframe n. With a 80% DL radio and the UL subframe 3 changed to a DL subframe, the TIF value in subframe 3 can be set as TIF=0 to inform the UE to feedback the HARQ-ACK on subframe 7.

Referring back to subframes 8 and 9 in the 80% DL ratio example, the HARQ-ACK for subframe 8 and 9 are transmitted on subframe 3 for DL ratios less than 80%. When subframe 3 changes to a DL subframe in case of an 80% DL ratio of subframes in the radio frame, subframe 3 may not conveyed the HARQ-ACK, so the node can inform the UE to feedback the HARQ-ACK on a different subframe(s). The node can set the TIF value of the DCI on the two subframes (i.e., subframes 8 and 9) as TIF=1. So, the TIF=1 subframes in FIG. 8A include subframes 4, 8, 9 in the case of DL ratio changed to 80%.

The reconfiguration of flexible subframes from a UL subframe to a downlink subframe can also change the PUSCH scheduling and PUSCH HARQ timing relationships. Similar to the PDSCH HARQ timing indication method (describe above), the PUSCH scheduling and/or the PUSCH HARQ timing indication can vary whether the UL ratio is increasing or decreasing with the new reconfiguration. For the case when the UL ratio decreases with reconfiguration, no DL A/N corresponding to a PUSCH transmission may be used for the PUSCH scheduling and/or PUSCH HARQ at FlexSF, which can support backward compatibility. But, if the UL subframe ratio increases another PUSCH scheduling timing, which is different from the timing used for the TDD configuration in SIB1, or another PUSCH HARQ timing, which is different from the timing used for the TDD configuration in SIB, can be signaled via the TIF.

In an example, Table 7, as illustrated in FIG. 8B, summarizes PUSCH scheduling by a PDCCH in subframe n for a PUSCH in subframe n+k, where k represent the numbers in Table 7. Table 8, as illustrated in FIG. 8C, summarizes PUSCH HARQ timing by a PDCCH in subframe n for a PHICH in n+$k_{PHICH}$, where $k_{PHICH}$ represent the numbers in Table 8. In an example, a 2-bit downlink assignment index (DAI) in a UL grant can be consistently interpreted similar to a legacy configuration 0. The DAI is a field in the downlink resource grant signaled to a UE, indicating how many subframes in a previous time window have contained transmissions to that UE. DAI can be applicable only when LTE is operated in TDD mode, and can enable the UE to determine whether the UE has received all the downlink transport blocks for which the UE transmits a combined ACK/NACK. For instance, the TDD configuration 1 with a dynamic 80-90% DL ratio can use a 2-bit DAI to indicate subframes 3 and 8.

The following provides an example of PUSCH scheduling for the TDD configuration 1, as illustrated in FIG. 8B. When the UL ratio decreases, subframe n is still available to schedule PUSCH of subframe n+k, thus the UE can use the existing legacy PUSCH scheduling timing relationship indicated by TIF=0 (e.g., TIF null). When the UL ratio increases, subframe n may not be available to schedule PUSCH of subframe n+k, thus the UE can use a second PDSCH scheduling timing relationship indicated by TIF=1. For instance, when the TIF value for subframes 1 and 6 equal 1 (and the TIF value for subframes 0, 3, 4, 5, 7, 8, and 9 equals zero), indicating a reconfiguration from a 40% UL ratio to a 60% UL ratio, subframe 0 can provide the PUSCH scheduling for subframe 4 of the same frame corresponding to k=4 in subframe 0, subframe 1 can provide the PUSCH scheduling for subframes 7 and 8 of the same frame corresponding to k=6 in subframe 1 (indicated with a 2-bit DAI), subframe 5 can provide the PUSCH scheduling for subframe 9 of the of the same frame corresponding to k=4 in subframe 5, and subframe 6 can provide the PUSCH scheduling for subframes 2 and 3 of a subsequent frame corresponding to k=6 in subframe 6 (indicated with a 2-bit DAI). When the TIF value for the DL subframes and FlexSFs equals 0 (e.g., subframes 0, 1, 3, 4, 5, 6, 7, 8, and 9), indicating no reconfiguration (e.g., maintain a 40% UL ratio), subframe 1 can provide the PUSCH scheduling for subframe 7 of the same frame corresponding to k=6 in subframe 1, subframe 4 can provide the PUSCH scheduling for subframe 8 of the of the same frame corresponding to k=4 in subframe 4, subframe 6 can provide the PUSCH scheduling for subframe 2 of a subsequent frame corresponding to k=6 in subframe 6, and subframe 9 can provide the PUSCH scheduling for subframe 3 of the same frame corresponding to k=4 in subframe 9. The underlining and bolding of the k values and the TIF=1 values can indicate a change in configuration from the next increment of the UL ratio.

The following provides an example of PUSCH HARQ timing for the TDD configuration 1, as illustrated in FIG. 8C. When the UL ratio decreases, subframe n is still available for the DL HARQ for PUSCH of subframe n, thus the UE can use the existing legacy PUSCH HARQ timing relationship indicated by TIF=0 (e.g., TIF null). When the UL ratio increases, subframe n may not be available for the DL HARQ for PUSCH of subframe n+k, thus the UE can use a second PDSCH HARQ timing relationship indicated by TIF=1. For instance, when the TIF value for subframes 1 and 6 equal 1 (and the TIF value for subframes 0, 3, 4, 5, 7, 8, and 9 equals zero), indicating a reconfiguration from a 40% UL ratio to a 60% UL ratio, subframe 0 can provide the DL HARQ (e.g., PHICH) for subframe 4 of the previous frame corresponding to k=6 (or $k_{PHICH}$=6) in subframe 4, subframe 1 can provide the DL HARQ for subframe 7 of the previous frame corresponding to k=4 in subframe 7 and subframe 1 can provide the DL HARQ for subframe 8 from two frames earlier corresponding to k=13 in subframe 8, subframe 5 can provide the DL HARQ for subframe 9 of the previous frame corresponding to k=6 in subframe 9, and subframe 6 can provide the DL HARQ for subframe 2 of the same frame corresponding to k=4 in subframe 2 and subframe 6 can provide the DL HARQ for subframe 3 of the previous frame corresponding to k=13 in subframe 3. When the TIF value for the DL subframes and FlexSFs equals 0 (e.g., subframes 0, 1, 3, 4, 5, 6, 7, 8, and 9), indicating no reconfiguration (e.g., maintain a 40% UL ratio), subframe 1 can provide the DL HARQ for subframe 7 of the previous frame corresponding to k=4 in subframe 7, subframe 4 can provide the DL HARQ for subframe 8 of the previous frame corresponding to k=6 in subframe 8, subframe 6 can provide the DL HARQ for subframe 2 of the same frame corresponding to k=4 in subframe 2, and subframe 9 can provide the DL HARQ for subframe 3 of the previous frame corresponding to k=6 in subframe 9. The underlining and bolding of the k values and the TIF=1 values can indicate a change in configuration from the next increment of the UL ratio.

Figure 10:
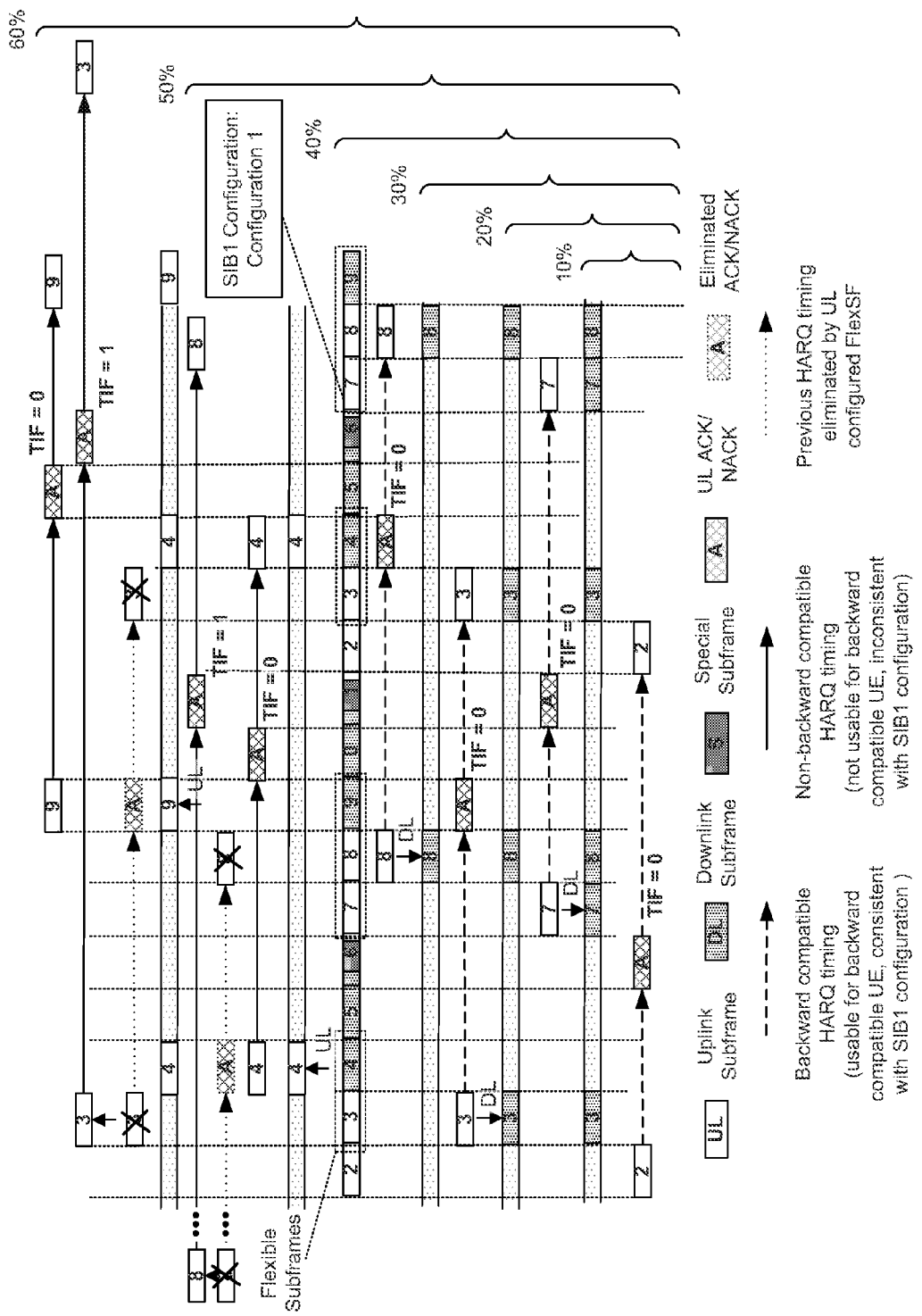
FIG. 10 illustrates a diagram for a physical uplink shared channel (PUSCH) hybrid automatic repeat request (HARQ) timing indication with a timing indication field (TIF) field for a legacy long term evolution (LTE) uplink-downlink (UL-DL) time-division duplexing (TDD) configuration 1 in accordance with an example.

FIG. 10 illustrates a detailed PUSCH HARQ signaling method with TIFs demonstrate the timing relationships with reconfiguration from the TDD configuration 1 to other configurations with an increasing or decreasing UL ratio. For example, the TDD configuration 1 with a dynamic 10-40% UL ratio using TIF=0 can have backward compatible HARQ timing consistent with a legacy SIB1 configuration. The TDD configuration 1 with a dynamic 50-60% UL ratio using TIF=1 may not have a backward compatible HARQ timing consistent with a legacy SIB1 configuration. In FIG. 10, the "x" over the uplink subframe carrying the PHICH indicates the DL HARQ timing corresponding to PUSCH is eliminated by a reconfigured from a DL subframe to a UL subframe. The reconfiguration of flexible subframes from a UL subframe to a downlink subframe can eliminate a downlink subframe for a DL HARQ as well as generate a new DL HARQ for the flexible subframes reconfigured as a UL subframe. For instance with a 50% UL ratio reconfiguration, subframe 4 can no longer transmit the PUSCH A/N for subframe 8. In addition, subframe 4 transmits the PHICH, so subframe 0 of a next radio frame can transmits the PUSCH A/N for subframe 4.

As shown in FIG. 10, when the UL ratio is changed from 40% to 50% by converting flexible subframe 4 from a DL subframe to an UL subframe, a HARQ-ACK timing associated with the UL subframe 8 can be changed subsequently to follow a second predefined HARQ timing (e.g., $h_1=13$ and $r_1=7$ represented as (8, 6, 4, 13, 7) for a value $(j,h_0,r_0,h_1,r_1)$ for the UL subframe j) because subframe 4 may not be available for a PHICH transmission. The two PUSCH HARQ timings for UL subframe $j\in\{2,3,4,7,8,9\}$ can be expressed as $(j,h_0,r_0, h_1,r_1)$, where upon detection of a physical hybrid ARQ indicator channel (PHICH) transmission in subframe $j-r_i$, where $i\in\{0,1\}$ intended for the UE, the UE adjusts a corresponding PUSCH transmission in subframe j, and receives an associated HARQ-acknowledgment (HARQ-ACK) on the PHICH assigned to the UE in subframe $j+h_i$. Index i=0 can represent when the 1-bit TIF value in the given DCI format for a corresponding first PUSCH transmission in subframe j is in a first state, and index i=1 can represent when the 1-bit TIF value in the given DCI format for the corresponding first PUSCH transmission in subframe j is in a second state for the SIB1 indicated UL-DL configuration. The node can inform the UE about timing change of the UL subframe 8, by the node transmitting the UL grant with TIF=1 in the subframe 1 (with k=6 corresponding to $r_1=7$), as shown in FIG. 8B. Then, the UE correspondingly knows that PUSCH can be transmitted on a following subframe 8 (e.g., $r_1=7$), and then to receive the PHICH on subframe 1 of a next radio frame (e.g., k=13 or $h_1=13$), as shown in FIG. 8C. When subframe 4 is changed from a DL subframe to a UL subframe in case of a 50% UL ratio, the node can schedule the UE to transmit PUSCH on the changed subframe 4. The node can transmit the UL grant in subframe 0 with a TIF=0 (e.g., k=4 or $r_0=4$ represented as (4,6,4,6,4) for a value $(j,h_0,r_0,h_1,r_1)$ for the UL subframe j), as shown in FIG. 8B. Upon detection the UL grant with TIF=0, the UE can transmit the PUSCH on a following subframe 4 (e.g., $r_0=4$), and then receive the PHICH in subframe 0 of a next radio frame (e.g., k=6 or $h_0=6$). For 50% UL ratio of a SIB1 configuration 1, a UL grant to schedule PUSCH transmission on subframe 4 can be transmitted on subframe 0 with TIF=0.

Following similar principles, processes, and methodologies previous described in relation to case 0, different scheduling and/or HARQ timings corresponding to the other six legacy TDD configurations (LTE UL-DL TDD configurations 0 and 2-6) can also be implemented. For example, FIGS. 11A-C illustrate scheduling and HARQ timings when the SIB1 configuration is TDD configuration 0 (i.e., case 1) using the TIF. FIG. 11A provides an example PDSCH HARQ timing in Table 9, FIG. 11B provides an example PUSCH scheduling timing in Table 10, and FIG. 11C provides an example PUSCH HARQ timing in Table 11 when the SIB1 configuration is TDD configuration 0.

In another example, FIGS. 12A-C illustrate scheduling and HARQ timings when the SIB1 configuration is TDD configuration 2 (i.e., case 2) using the TIF. FIG. 12A provides an example PDSCH HARQ timing in Table 12, FIG. 12B provides an example PUSCH scheduling timing in Table 13, and FIG. 12C provides an example PUSCH HARQ timing in Table 14 when the SIB1 configuration is TDD configuration 2.

In another example, FIGS. 13A-C illustrate scheduling and HARQ timings when the SIB1 configuration is TDD configuration 3 (i.e., case 3) using the TIF. FIG. 13A provides an example PDSCH HARQ timing in Table 15, FIG. 13B provides an example PUSCH scheduling timing in Table 16, and FIG. 13C provides an example PUSCH HARQ timing in Table 17 when the SIB1 configuration is TDD configuration 3.

In another example, FIGS. 14A-C illustrate scheduling and HARQ timings when the SIB1 configuration is TDD configuration 4 (i.e., case 4) using the TIF. FIG. 14A provides an example PDSCH HARQ timing in Table 18, FIG. 14B provides an example PUSCH scheduling timing in Table 19, and FIG. 14C provides an example PUSCH HARQ timing in Table 20 when the SIB1 configuration is TDD configuration 4.

In another example, FIGS. 15A-C illustrate scheduling and HARQ timings when the SIB1 configuration is TDD configuration 5 (i.e., case 5) using the TIF. FIG. 15A provides an example PDSCH HARQ timing in Table 21, FIG. 15B provides an example PUSCH scheduling timing in Table 22, and FIG. 15C provides an example PUSCH HARQ timing in Table 23 when the SIB1 configuration is TDD configuration 5.

In another example, FIGS. 16A-C illustrate scheduling and HARQ timings when the SIB1 configuration is TDD configuration 6 (i.e., case 6) using the TIF. FIG. 16A provides an example PDSCH HARQ timing in Table 24, FIG. 16B provides an example PUSCH scheduling timing in Table 25, and FIG. 16C provides an example PUSCH HARQ timing in Table 26 when the SIB1 configuration is TDD configuration 6.

The methods, processes, and system described herein can provide mechanisms to support dynamic allocation of UL-DL subframes in a backward compatible manner.

In an example (i.e., static DCI size), each DCI for a DL configured subframe (e.g., fixed subframe or flexible subframe) can carry a TIF with either a value of 0 or 1, where a default value can be TIF=0. In static DCI size example, the TIF can be presented in every DCI in each DL subframe for the UEs supporting UL-DL reconfiguration regardless whether the DL subframe is FlexSF configured as a DL subframe or a fixed DL subframe, which can reduce blind decoding attempts on DCI at a UE side.

In another example (i.e., dynamic DCI size), the downlink frames (e.g., fixed subframe or flexible subframe) controlling a timing change from the SIB1 configuration can carry a TIF with either a value of 0 or 1, and the rest of the DCIs in the downlink frames may not include a TIF, but the UE implement/power consumption can be increased over including a TIF in every DCI in each DL subframe (e.g., static DCI size).

For example, as shown in FIG. 9, when the DL ratio increases from 60% to 70% by changing the subframe 4 from a UL subframe to a DL subframe, including a TIF in only DCIs of DL subframes providing a timing change can mean the UE may have no any prior-knowledge on a TIF present or not present during a DCI blind-detection. Then, the UE may perform two times the number of CRC checking for each blind decoding according to each of two hypothesis of DCI size (e.g., (X) and (X+1), where 1 correspond to the TIF, where the TIF is a 1-bit TIF). Consequently, the power consumption can be doubled for each decoding, which can total 32 times the blind decodes (BD) used on UE-specific search space (USS), so additional the BDs can be substantial.

A dynamically changeable DCI format size scheme (e.g., dynamic DCI size) can introduce doubled BD for DCI detection at the UE side due to two hypothesis checking. The dynamic DCI size method may provide better DCI detection quality due to less information bits carried for the case of TIF=0, but the benefit may be offset with more UE power consumption, so any gain maybe marginal.

Figure 17:
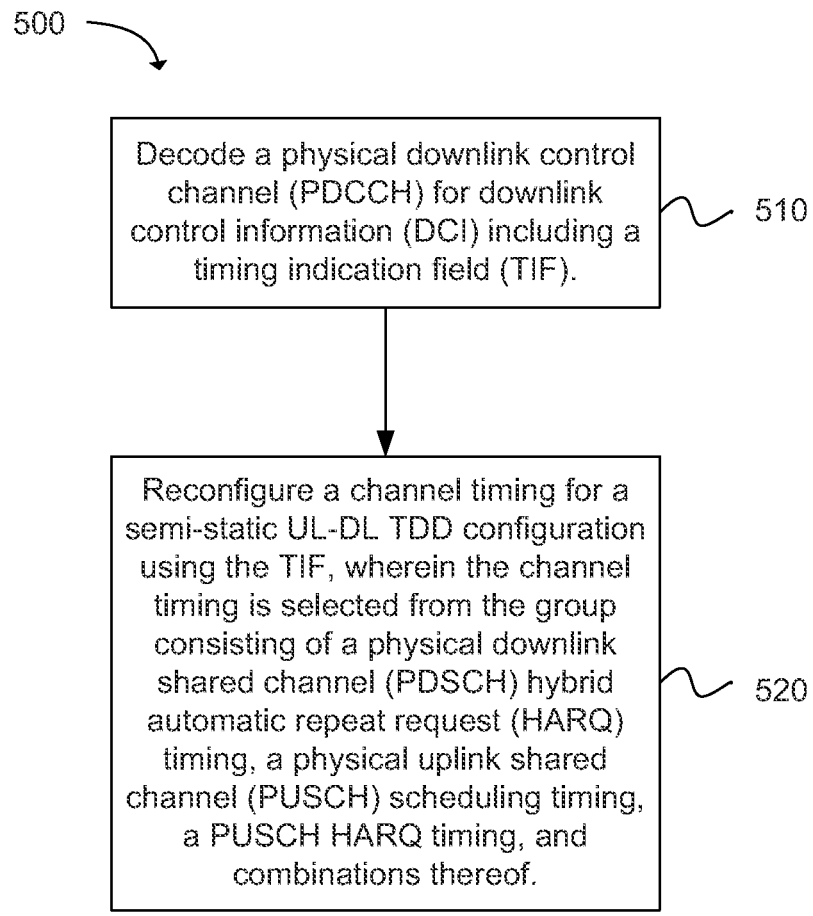
FIG. 17 depicts a flow chart of a method for reconfiguring an uplink-downlink (UL-DL) time-division duplexing (TDD) configuration timing in accordance with an example.

Another example provides a method 500 for reconfiguring an uplink-downlink (UL-DL) time-division duplexing (TDD) configuration timing, as shown in the flow chart in FIG. 17. The method may be executed as instructions on a machine or computer circuitry, where the instructions are included on at least one computer readable medium or one non-transitory machine readable storage medium. A user equipment (UE) for reconfiguring an uplink-downlink (UL-DL) time-division duplexing (TDD) configuration timing can have computer circuitry to perform the method 500. The computer circuitry can be configured to decode a physical downlink control channel (PDCCH) for downlink control information (DCI) including a timing indication field (TIF), as in block 510. The computer circuitry can be further configured to reconfigure a channel timing for a semi-static UL-DL TDD configuration using the TIF, wherein the channel timing is selected from the group consisting of a physical downlink shared channel (PDSCH) hybrid automatic repeat request (HARQ) timing, a physical uplink shared channel (PUSCH) scheduling timing, a PUSCH HARQ timing, and combinations thereof, as in block 520.

The TIF can be used to dynamically reconfigure the channel timing for a UL-DL TDD configuration within a duration of approximately one radio frame or approximately 10 milliseconds (ms). The DCI can be transmitted in a UE-specific search space and the TIF can be conditionally padded to a legacy DCI for the UE to support a UL-DL TDD reconfiguration.

In another example, the computer circuitry configured to decode the DCI can be further configured to attempt to decode each PDCCH candidate in a flexible subframe (FlexSF) with a specified DCI format size with the TIF unless the UE is explicitly instructed to transmit in an uplink for a PUCCH (physical uplink control channel) or a PUSCH. The flexible subframe can be capable of changing an uplink-downlink transmission direction for a set of legacy UL-DL TDD configurations. In a configuration, the TIF uses 3-bits to provide a one-to-one mapping to one of seven legacy UL-DL TDD configurations.

In another configuration, the TIF uses 1-bit to indicate a change from the semi-static UL-DL TDD configuration to another predefined UL-DL TDD configuration. The computer circuitry enabled to reconfigure the channel timing can be further configured to reconfigure the PDSCH HARQ timing based on a combination of enabled TIF values within subframes of a radio frame for a system information block type 1 (SIB1) indicated UL-DL TDD configuration with an increasing number of downlink subframes from the semi-static UL-DL TDD configuration. The enabled TIF values can be 1-bit values having one of two states of either '0' or '1' indicating one of two predefined PDSCH HARQ timings for a PDSCH transmission or a downlink semi-persistent scheduling (SPS) release indicated by a detection of a corresponding DCI with the TIF. The two predefined PDSCH HARQ timings indicated by the TIF can be predefined based on a downlink (DL) subframe index and the SIB1 indicated UL-DL configuration.

For example, the two predefined PDSCH HARQ timings for DL subframe n ($0 \leq n \leq 9$) can expressed as $(n,k_0,k_1)$. The PDSCH transmission or the downlink SPS release can be indicated by the detection of the corresponding PDCCH with the 1-bit TIF in a DL subframe n. The UE transmits a HARQ-acknowledgment (HARQ-ACK) in a subframe $n+k_0$ when the TIF value is in a first state, or the UE can transmit the HARQ-ACK in subframe $n+k_1$ when the TIF value is in a second state for the SIB1 indicated UL-DL configuration. When the UL-DL configuration indicated by the SIB1 is a TDD configuration 0, the $(n,k_0,k_1)$ value for the DL subframe n can be defined as: (0,4,12), (1,6,11), (3,9,9), (4,9,8), (5,4,7), (6,6,6), (7,6,5), (8,5,4), and (9,4,13), as illustrated in FIG. 11A. When the UL-DL configuration indicated by the SIB1 is a TDD configuration 1, the $(n,k_0,k_1)$ value for the DL subframe n can be defined as: (0,7,12), (1,6,11), (3,4,9), (4,4,8), (5,7,7), (6,6,6), (7,5,5), (8,5,4), and (9,4,13), as illustrated in FIGS. 7A and 8. When the UL-DL configuration indicated by the SIB1 is a TDD configuration 2, the $(n,k_0,k_1)$ value for the DL subframe n can be defined as: (0,7,12), (1,6,11), (3,4,9), (4,8,8), (5,7,7), (6,6,6), (7,5,5), (8,4,4), and (9,8,13), as illustrated in FIG. 12A. When the UL-DL configuration indicated by the SIB1 is a TDD configuration 3, the $(n,k_0,k_1)$ value for the DL subframe n can be defined as: (0,4,12), (1,11,11), (3,9,9), (4,9,8), (5,7,7), (6,6,6), (7,6,5), (8,5,4), and (9,5,13), as illustrated in FIG. 13A. When the UL-DL configuration indicated by the SIB1 is a TDD configuration 4, the $(n,k_0,k_1)$ value for the DL subframe n can be defined as: (0,12,12), (1,11,11), (3,9,9), (4,8,8), (5,7,7), (6,7,6), (7,6,5), (8,5,4), and (9,4,13), as illustrated in FIG. 14A. When the UL-DL configuration indicated by the SIB1 is a TDD configuration 5, the $(n,k_0,k_1)$ value for the DL subframe n can be defined as: (0,12,4); (1,11,6); (3,9,9); (4,8,8); (5,7,4); (6,6,6); (7,5,5); (8,4,4); and (9,13,4), as illustrated in FIG. 15A. When the UL-DL configuration indicated by the SIB1 is a TDD configuration 6, the $(n,k_0,k_1)$ value for the DL subframe n can be defined as: (0,7,12), (1,7,11), (3,9,9), (4,9,8), (5,7,7), (6,7,6), (7,6,5), (8,5,4), and (9,5,13), as illustrated in FIG. 16A.

In another example, the computer circuitry enabled to reconfigure the channel timing can be further configured to reconfigure the PUSCH scheduling timing or the PUSCH HARQ timing based on a combination of enabled TIF values within subframes of a radio frame for a system information block type 1 (SIB1) indicated UL-DL TDD configuration with an increasing number of uplink subframes from the semi-static UL-DL TDD configuration. The enabled TIF values can have 1-bit values having one of two states of either '0' or '1' indicating one of two predefined PUSCH HARQ timings for each PUSCH transmission. The two PUSCH scheduling timings and PUSCH HARQ timings indicated by the TIF can be predefined based on an uplink (UL) subframe index and the SIB1 indicated UL-DL configuration.

For example, the two PUSCH HARQ timings for UL subframe $j \in \{2,3,4,7,8,9\}$ can be expressed as $(j,h_0,r_0,h_1,r_1)$. Upon detection of a physical hybrid ARQ indicator channel (PHICH) transmission in subframe $j-r_i$ where $i \in \{0,1\}$ intended for the UE, the UE can adjusts a corresponding PUSCH transmission in subframe j, and can receive an associated HARQ-acknowledgment (HARQ-ACK) on the PHICH assigned to the UE in subframe $j+h_i$. The index i=0 when the 1-bit TIF value in the given DCI format for a corresponding first PUSCH transmission in subframe j is in a first state, and i=1 when the 1-bit TIF value in the given DCI format for the corresponding first PUSCH transmission in subframe j is in a second state for the SIB1 indicated UL-DL configuration. When the UL-DL configuration indicated by the SIB1 is a TDD configuration 0, the $(j,h_0,r_0,h_1,r_1)$ value for the UL subframe j can be defined as: (2,4,7,4,6), (3,7,4,5,4), (4,6,7,4,4), (7,4,7,8,7), (8,7,4,7,7), and (9,6,7,6,7), as illustrated in FIGS. 10B-C. When the UL-DL configuration indicated by the SIB1 is a TDD configuration 1, the $(j,h_0,r_0,h_1,r_1)$ value for the UL subframe j can be defined as: (2,4,6,4,6), (3,6,4,13,7), (4,6,4,6,4), (7,4,6,4,6), (8,6,4,13,7), and (9,6,4,6,4), as illustrated in FIGS. 7B-C and 9. When the UL-DL configuration indicated by the SIB1 is a TDD configuration 2, the $(j,h_0,r_0,h_1,r_1)$ value for the UL subframe j can be defined as: (2,6,4,4,6), (3,6,4,13,7), (4,6,4,6,4), (7,6,4,4,6), (8,13,7,13,7), and (9,6,4,6,4), as illustrated in FIGS. 11B-C. When the UL-DL configuration indicated by the SIB1 is a TDD configuration 3 or a TDD configuration 4 or a TDD configuration 5, the $(j,h_0,r_0,h_1,r_1)$ value for the UL subframe j can be defined as: (2,6,4,4,6), (3,6,4,13,7), (4,6,4,6,4), (7,4,6,4,6), (8,13,7,13,7), and (9,6,4,6,4), as illustrated in FIGS. 12B-C, 13B-C, and 14B-C. When the UL-DL configuration indicated by the SIB1 is a TDD configuration 6, the $(j,h_0,r_0,h_1,r_1)$ value for the UL subframe j can be defined as: (2,4,7,6,4), (3,6,5,7,4), (4,6,7,4,4), (7,4,7,8,7), (8,7,7,7,7), and (9,6,4,6,4), as illustrated in FIGS. 15B-C.

In another example, the computer circuitry can be further configured to: Transmit a PDSCH HARQ to a node based on the reconfigured semi-static UL-DL TDD configuration; transmit the a PUSCH to the node based on the reconfigured semi-static UL-DL TDD configuration; or receive a PUSCH HARQ from the node based on the reconfigured semi-static UL-DL TDD configuration. In another configuration, the computer circuitry can be further configured to receive the PDCCH in a downlink subframe, a special subframe, or a flexible subframe, wherein the flexible subframe is capable of changing an uplink-downlink transmission direction for a set of legacy UL-DL TDD configurations.

Figure 18:
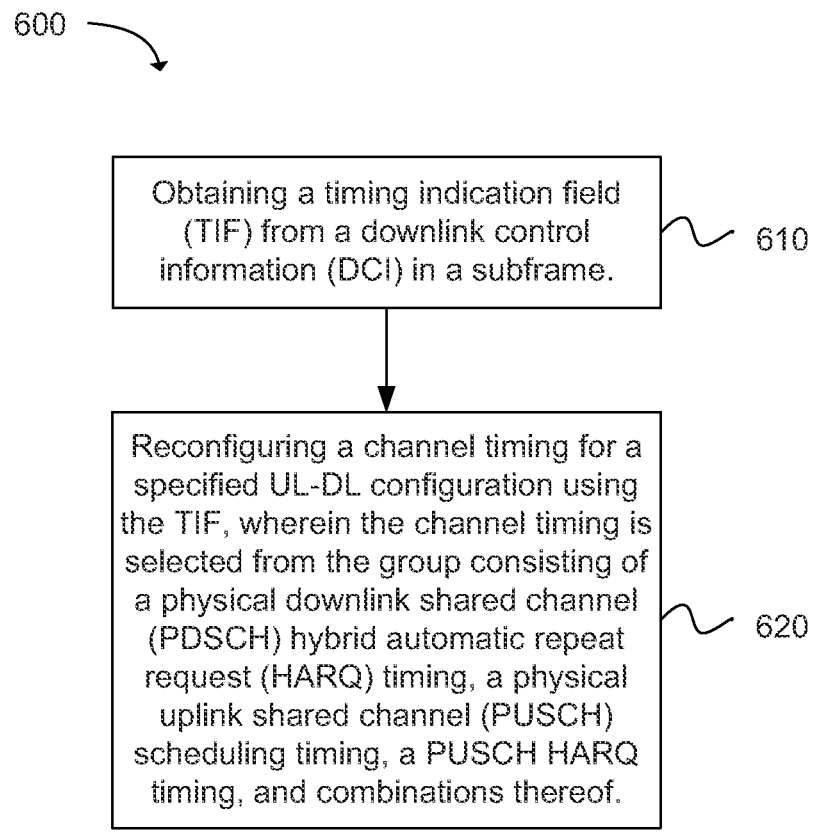
FIG. 18 depicts a flow chart of a method for indicating an uplink-downlink (UL-DL) time-division duplexing (TDD) reconfiguration in accordance with an example.

Another example provides a method 600 for indicating an uplink-downlink (UL-DL) time-division duplexing (TDD) reconfiguration, as shown in the flow chart in FIG. 18. The method may be executed as instructions on a machine or computer circuitry, where the instructions are included on at least one computer readable medium or one non-transitory machine readable storage medium. The method includes the operation of obtaining a timing indication field (TIF) from a downlink control information (DCI) in a subframe, as in block 610. The operation of reconfiguring a channel timing for a specified UL-DL configuration using the TIF, wherein the channel timing is selected from the group consisting of a physical downlink shared channel (PDSCH) hybrid automatic repeat request (HARQ) timing, a physical uplink shared channel (PUSCH) scheduling timing, a PUSCH HARQ timing, and combinations thereof follows, as in block 620.

In example, the method can further include decoding each physical downlink control channel (PDCCH) in a flexible subframe (FlexSF). The flexible subframe can be capable of changing an uplink-downlink transmission direction for a set of UL-DL configurations. The TIF can include 3-bits to provide a mapping to a legacy UL-DL configuration.

In another example, the TIF includes 1-bit to indicate a change in the channel timing for the specified UL-DL configuration configured through a system information block type 1 (SIB1) to a UL-DL configuration with an increase or decrease in downlink subframes relative to the specified UL-DL configuration. The operation of reconfiguring the channel timing for the specified UL-DL TDD configuration can further include: Reconfiguring the PDSCH HARQ timing based on a combination of TIF values within subframes of a radio frame for a UL-DL configuration with an increasing number of downlink subframes relative to the specified UL-DL configuration; reconfiguring the PDSCH HARQ timing based on a combination of TIF values within subframes of the radio frame for a UL-DL configuration with an decreasing number of downlink subframes relative to the specified UL-DL configuration, where the specified UL-DL configuration has a maximum number of downlink subframes in a set of legacy UL-DL configurations; reconfiguring the PUSCH scheduling timing or the PUSCH HARQ based on a combination of TIF values within subframes of the radio frame for a UL-DL configuration with an increasing number of uplink subframes relative to the specified UL-DL configuration; or reconfiguring the PUSCH scheduling timing or the PUSCH HARQ based on a combination of TIF values within subframes of the radio frame for a UL-DL configuration with an decreasing number of uplink subframes relative to the specified UL-DL configuration, where the specified UL-DL configuration has a maximum number of uplink subframes in a set of legacy UL-DL configurations.

Figure 19:
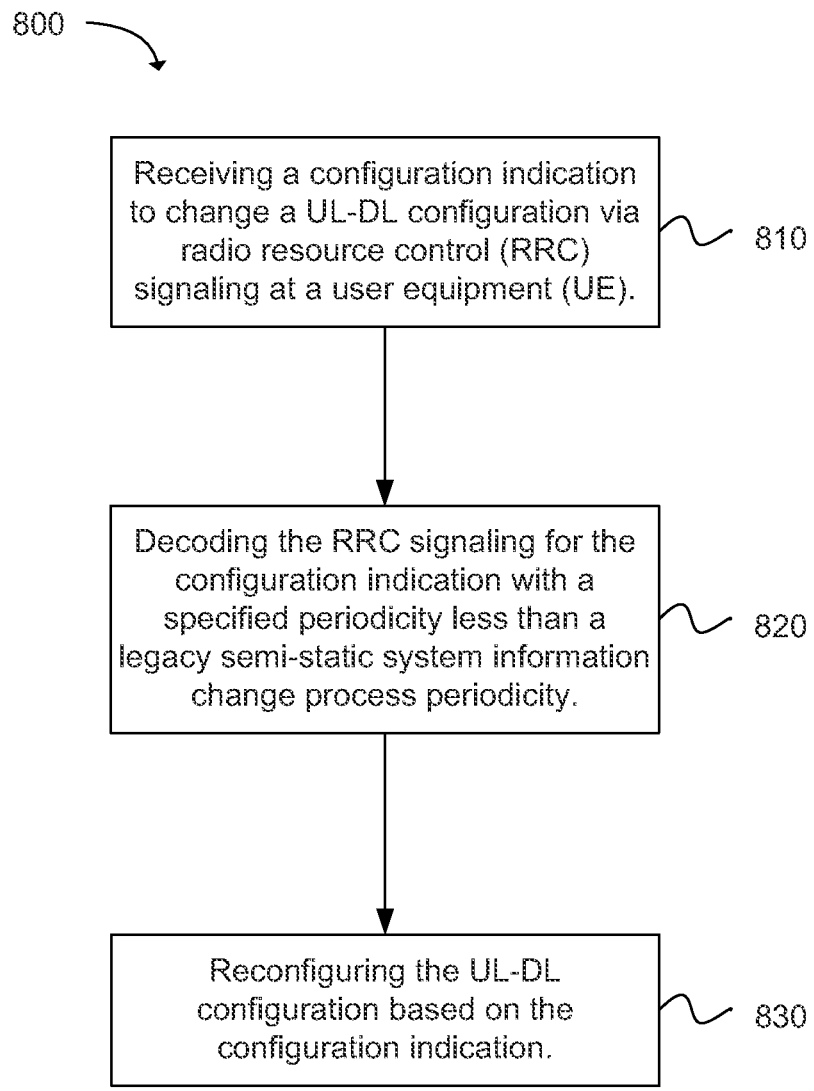
FIG. 19 depicts a flow chart of a method for indicating an uplink-downlink (UL-DL) time-division duplexing (TDD) reconfiguration in accordance with an example.

Another example provides a method 800 indicating an uplink-downlink (UL-DL) time-division duplexing (TDD) reconfiguration, as shown in the flow chart in FIG. 19. The method may be executed as instructions on a machine or computer circuitry, where the instructions are included on at least one computer readable medium or one non-transitory machine readable storage medium. The method includes the operation of receiving a configuration indication to change a UL-DL configuration via radio resource control (RRC) signaling at a user equipment (UE), as in block 810. The operation of decoding the RRC signaling for the configuration indication with a specified periodicity less than a legacy semi-static system information change process periodicity follows, as in block 820. The next operation of the method can be reconfiguring the UL-DL configuration based on the configuration indication, as in block 830.

The configuration indication can include 3-bits in a master information block (MIB) to indicate up to eight different UL-DL TDD configurations, such as the LTE legacy UL-DL TDD configurations. In an example, the legacy semi-static system information change process periodicity can be approximately 640 milliseconds (ms). The specified periodicity can be less than approximately 50 milliseconds (ms). In a configuration, the operation of decoding the RRC signaling for the configuration indication can further include decoding a master information block (MIB) each time the MIB is sent by a node.

Figure 20:
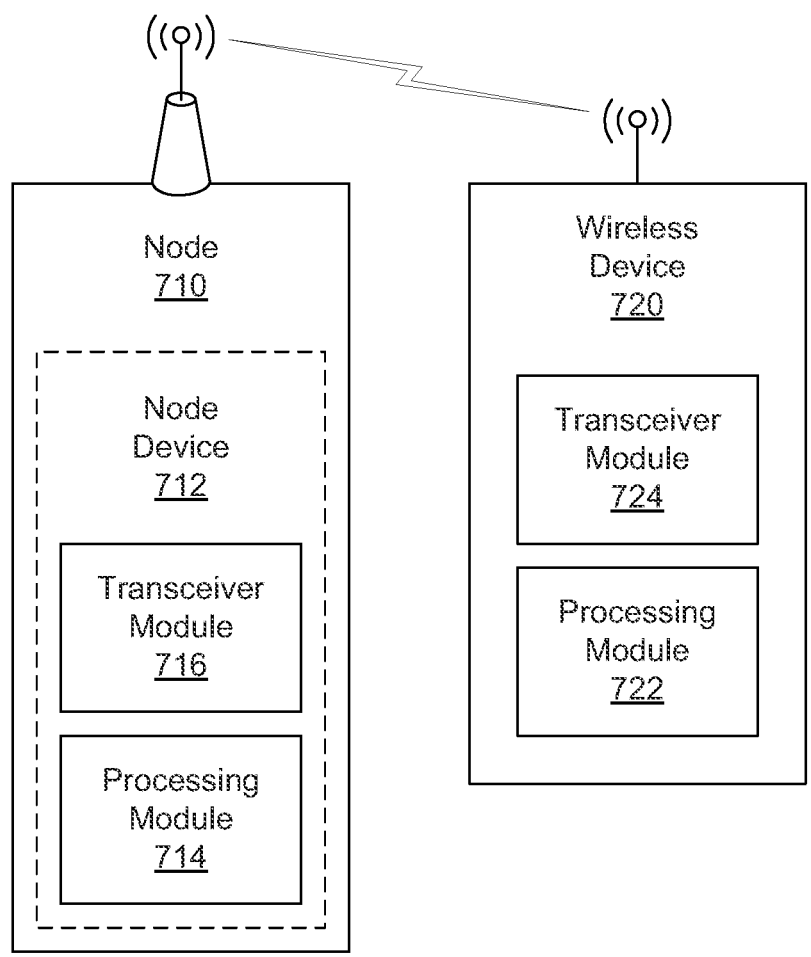
FIG. 20 illustrates a block diagram of a node (e.g., eNB) and wireless device (e.g., UE) in accordance with an example.

FIG. 20 illustrates an example node 710 (e.g., eNB) and an example wireless device 720 (e.g., UE). The node can include a node device 712. The node device or the node can be configured to communicate with the wireless device. The node device can be configured to dynamically reconfigure an uplink-downlink (UL-DL) time-division duplexing (TDD) configuration. The node device can include a processing module 714 and a transceiver module 716. The processing module can be configured to encode downlink control information (DCI) including a timing indication field (TIF) in a physical downlink control channel (PDCCH). The TIF can be used to dynamically reconfigure a UL-DL TDD configuration of a user equipment (UE) by increasing or decreasing a number of uplink subframes in a radio frame from a semi-static UL-DL TDD configuration, such as UL-DL configuration indicated by SIB1. The transceiver module can be configured to transmit the PDCCH with the TIF to the UE and transmit a flexible subframe (FlexSF) configured as a downlink subframe. The flexible subframe can be capable of changing an uplink-downlink transmission direction for a set of UL-DL TDD configurations.

In another configuration, transceiver module 716 can be further configured to: Receive a physical downlink shared channel (PDSCH) hybrid automatic repeat request (HARQ) from the UE based on the reconfigured UL-DL TDD configuration; receive a physical uplink shared channel (PUSCH) from the UE based on the reconfigured UL-DL TDD configuration; or transmit a PUSCH HARQ to the UE based on the reconfigured UL-DL TDD configuration. The processing module 714 can be further operable to: Dynamically monitor uplink and downlink traffic for the node; and dynamically determine a change in the UL-DL TDD configuration based on uplink and downlink traffic. The TIF can be used to dynamically reconfigure the UL-DL TDD configuration within a duration of approximately one radio frame or approximately 10 milliseconds (ms). The DCI can be encoded in a UE-specific search space. The TIF can be conditionally padded to a legacy DCI. The TIF can use 3-bits to indicate a mapping to a legacy UL-DL TDD configuration or the TIF can use 1-bit to indicate a change from the semi-static UL-DL TDD configuration to another predefined UL-DL TDD configuration. The node 710 can include a base station (BS), a Node B (NB), an evolved Node B (eNB), a baseband unit (BBU), a remote radio head (RRH), a remote radio equipment (RRE), a remote radio unit (RRU), a central processing module (CPM).

The wireless device 720 can include a transceiver module 724 and a processing module 722. The wireless device can be configured for reconfiguring an uplink-downlink (UL-DL) time-division duplexing (TDD) configuration timing. The processing module or decoder can be configured to decode a physical downlink control channel (PDCCH) for downlink control information (DCI) including a timing indication field (TIF). The processing module can be configured to reconfigure a channel timing for a semi-static UL-DL TDD configuration using the TIF. The channel timing can include a physical downlink shared channel (PDSCH) hybrid automatic repeat request (HARQ) timing, a physical uplink shared channel (PUSCH) scheduling timing, or a PUSCH HARQ timing. The transceiver module can be configured to transmit the DCI including the TIF in a UE-specific search space.

In another example, the transceiver module 724 can be configured to: Transmit a physical downlink shared channel (PDSCH) hybrid automatic repeat request (HARQ) to the node based on the reconfigured UL-DL TDD configuration; transmit a physical uplink shared channel (PUSCH) to the node based on the reconfigured UL-DL TDD configuration; or receive a PUSCH HARQ from the node based on the reconfigured UL-DL TDD configuration.

Figure 21:
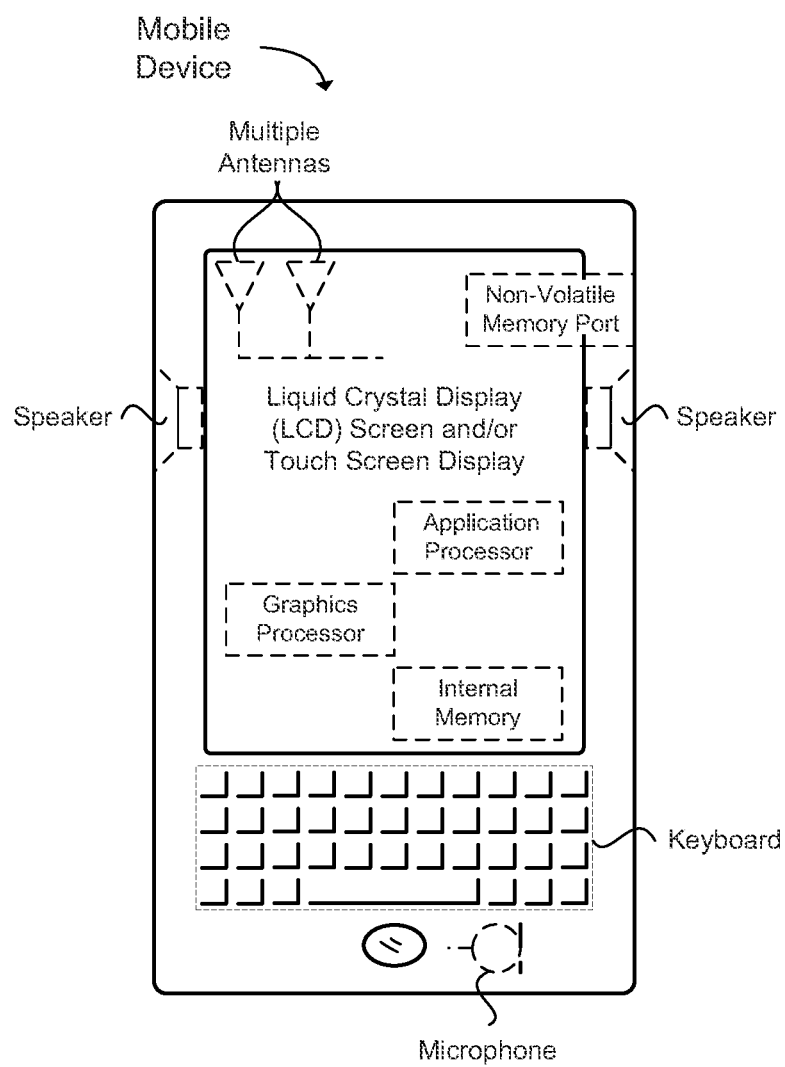
FIG. 21 illustrates a diagram of a wireless device (e.g., UE) in accordance with an example.

FIG. 21 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or transmission station, such as a base station (BS), an evolved Node B (eNB), a baseband unit (BBU), a remote radio head (RRH), a remote radio equipment (RRE), a relay station (RS), a radio equipment (RE), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 21 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A user equipment (UE) for reconfiguring an uplink-downlink (UL-DL) time-division duplexing (TDD) configuration timing, having computer circuitry configured to:
   decode a physical downlink control channel (PDCCH) for downlink control information (DCI) including a timing indication field (TIF); and
   reconfigure a channel timing for a semi-static UL-DL TDD configuration using the TIF, wherein the channel timing is selected from the group consisting of a physical downlink shared channel (PDSCH) hybrid automatic repeat request (HARQ) timing, a physical uplink shared channel (PUSCH) scheduling timing, a PUSCH HARQ timing, and combinations thereof.

2. The computer circuitry of claim 1, wherein the TIF is used to dynamically reconfigure the channel timing for a UL-DL TDD configuration within a duration of approximately one radio frame or approximately 10 milliseconds (ms).

3. The computer circuitry of claim 1, wherein the DCI is transmitted in a UE-specific search space and the TIF is conditionally padded to a legacy DCI for the UE to support a UL-DL TDD reconfiguration.

4. The computer circuitry of claim 1, wherein computer circuitry configured to decode the DCI is further configured to:
   attempt to decode each PDCCH candidate in a flexible subframe (FlexSF) with a specified DCI format size with the TIF unless the UE is explicitly instructed to transmit in an uplink for a PUCCH (physical uplink control channel) or a PUSCH, wherein the flexible subframe is capable of changing an uplink-downlink transmission direction for a set of legacy UL-DL TDD configurations.

5. The computer circuitry of claim 1, wherein the TIF uses 3-bits to provide a one-to-one mapping to one of seven legacy UL-DL TDD configurations.

6. The computer circuitry of claim 1, wherein the TIF uses 1-bit to indicate a change from the semi-static UL-DL TDD configuration to another predefined UL-DL TDD configuration.

7. The computer circuitry of claim 6, wherein computer circuitry enabled to reconfigure the channel timing is further configured to:
   reconfigure the PDSCH HARQ timing based on a combination of enabled TIF values within subframes of a radio frame for a system information block type 1 (SIB1) indicated UL-DL TDD configuration with an increasing number of downlink subframes from the semi-static UL-DL TDD configuration.

8. The computer circuitry of claim 7, wherein the enabled TIF values are 1-bit values having one of two states of either '0' or '1' indicating one of two predefined PDSCH HARQ timings for a PDSCH transmission or a downlink semi-persistent scheduling (SPS) release indicated by a detection of a corresponding DCI with the TIF.

9. The computer circuitry of claim 8, wherein the two predefined PDSCH HARQ timings indicated by the TIF are predefined based on a downlink (DL) subframe index and the SIB1 indicated UL-DL configuration.

10. The computer circuitry of claim 9, wherein the two predefined PDSCH HARQ timings for DL subframe n ($0 \leq n \leq 9$) are expressed as $(n, k_0, k_1)$, wherein the PDSCH transmission or the downlink SPS release is indicated by the detection of the corresponding PDCCH with the 1-bit TIF in a DL subframe n, and the UE transmits a HARQ-acknowledgment (HARQ-ACK) in a subframe $n+k_0$ when the TIF value is in a first state or the UE transmits the HARQ-ACK in subframe $n+k_1$ when the TIF value is in a second state for the SIB1 indicated UL-DL configuration, wherein:
   when the UL-DL configuration indicated by the SIB1 is a TDD configuration 0, the $(n, k_0, k_1)$ value for the DL subframe n is defined as: (0,4,12), (1,6,11), (3,9,9), (4,9,8), (5,4,7), (6,6,6), (7,6,5), (8,5,4), and (9,4,13);
   when the UL-DL configuration indicated by the SIB1 is a TDD configuration 1, the $(n, k_0, k_1)$ value for the DL subframe n is defined as: (0,7,12), (1,6,11), (3,4,9), (4,4,8), (5,7,7), (6,6,6), (7,5,5), (8,5,4), and (9,4,13);
   when the UL-DL configuration indicated by the SIB1 is a TDD configuration 2, the $(n, k_0, k_1)$ value for the DL subframe n is defined as: (0,7,12), (1,6,11), (3,4,9), (4,8,8), (5,7,7), (6,6,6), (7,5,5), (8,4,4), and (9,8,13);
   when the UL-DL configuration indicated by the SIB1 is a TDD configuration 3, the $(n, k_0, k_1)$ value for the DL subframe n is defined as: (0,4,12), (1,11,11), (3,9,9), (4,9,8), (5,7,7), (6,6,6), (7,6,5), (8,5,4), and (9,5,13);
   when the UL-DL configuration indicated by the SIB1 is a TDD configuration 4, the $(n, k_0, k_1)$ value for the DL subframe n is defined as: (0,12,12), (1,11,11), (3,9,9), (4,8,8), (5,7,7), (6,7,6), (7,6,5), (8,5,4), and (9,4,13);

when the UL-DL configuration indicated by the SIB1 is a TDD configuration 5, the $(n,k_0,k_1)$ value for the DL subframe n is defined as: (0,12,4); (1,11,6); (3,9,9); (4,8,8); (5,7,4); (6,6,6); (7,5,5); (8,4,4); and (9,13,4); or when the UL-DL configuration indicated by the SIB1 is a TDD configuration 6, the $(n,k_0,k_1)$ value for the DL subframe n is defined as: (0,7,12), (1,7,11), (3,9,9), (4,9,8), (5,7,7), (6,7,6), (7,6,5), (8,5,4), and (9,5,13).

11. The computer circuitry of claim 6, wherein computer circuitry enabled to reconfigure the channel timing is further configured to:

reconfigure the PUSCH scheduling timing or the PUSCH HARQ timing based on a combination of enabled TIF values within subframes of a radio frame for a system information block type 1 (SIB1) indicated UL-DL TDD configuration with an increasing number of uplink subframes from the semi-static UL-DL TDD configuration.

12. The computer circuitry of claim 11, wherein the enabled TIF values are 1-bit values having one of two states of either '0' or '1' indicating one of two predefined PUSCH HARQ timings for each PUSCH transmission.

13. The computer circuitry of claim 12, wherein the two PUSCH scheduling timings and PUSCH HARQ timings indicated by the TIF are predefined based on an uplink (UL) subframe index and the SIB1 indicated UL-DL configuration.

14. The computer circuitry of claim 13, wherein the two PUSCH HARQ timings for UL subframe $j \in \{2,3,4,7,8,9\}$ are expressed as $(j,h_0,r_0, h_1,r_1)$, wherein upon detection of a physical hybrid ARQ indicator channel (PHICH) transmission in subframe $j-r_i$ where $i \in \{0,1\}$ intended for the UE, the UE adjusts a corresponding PUSCH transmission in subframe j, and receives an associated HARQ-acknowledgment (HARQ-ACK) on the PHICH assigned to the UE in subframe $j+h_i$, where i=0 when the 1-bit TIF value in the given DCI format for a corresponding first PUSCH transmission in subframe j is in a first state, and i=1 when the 1-bit TIF value in the given DCI format for the corresponding first PUSCH transmission in subframe j is in a second state for the SIB1 indicated UL-DL configuration, wherein:

when the UL-DL configuration indicated by the SIB1 is a TDD configuration 0, the $(j,h_0,r_0,h_1,r_1)$ value for the UL subframe j is defined as: (2,4,7,4,6), (3,7,4,5,4), (4,6,7,4,4), (7,4,7,8,7), (8,7,4,7,7), and (9,6,7,6,7);

when the UL-DL configuration indicated by the SIB1 is a TDD configuration 1, the $(j,h_0, r_0,h_1,r_1)$ value for the UL subframe j is defined as: (2,4,6,4,6), (3,6,4,13,7), (4,6,4,6,4), (7,4,6,4,6), (8,6,4,13,7), and (9,6,4,6,4);

when the UL-DL configuration indicated by the SIB1 is a TDD configuration 2, the $(j,h_0,r_0, h_1,r_1)$ value for the UL subframe j is defined as: (2,6,4,4,6), (3,6,4,13,7), (4,6,4,6,4), (7,6,4,4,6), (8,13,7,13,7), and (9,6,4,6,4);

when the UL-DL configuration indicated by the SIB1 is a TDD configuration 3 or a TDD configuration 4 or a TDD configuration 5, the $(j,h_0,r_0,h_1,r_1)$ value for the UL subframe j is defined as: (2,6,4,4,6), (3,6,4,13,7), (4,6,4,6,4), (7,4,6,4,6), (8,13,7,13,7), and (9,6,4,6,4); or when the UL-DL configuration indicated by the SIB1 is a TDD configuration 6, the $(j,h_0,r_0,h_1,r_1)$ value for the UL subframe j is defined as: (2,4,7,6,4), (3,6,5,7,4), (4,6,7,4,4), (7,4,7,8,7), (8,7,7,7,7), and (9,6,4,6,4).

15. The computer circuitry of claim 1, wherein computer circuitry is further configured to:

transmit a PDSCH HARQ to a node based on the reconfigured semi-static UL-DL TDD configuration;
transmit the a PUSCH to the node based on the reconfigured semi-static UL-DL TDD configuration; or
receive a PUSCH HARQ from the node based on the reconfigured semi-static UL-DL TDD configuration.

16. The computer circuitry of claim 1, wherein computer circuitry is further configured to:

receive the PDCCH in a downlink subframe, a special subframe, or a flexible subframe, wherein the flexible subframe is capable of changing an uplink-downlink transmission direction for a set of legacy UL-DL TDD configurations.

17. The computer circuitry of claim 1, wherein the UE includes at least one of an antenna, a touch sensitive display screen, a speaker, a microphone, a graphics processor, an application processor, internal memory, a non-volatile memory port, and combinations thereof.

18. A method for indicating an uplink-downlink (UL-DL) time-division duplexing (TDD) reconfiguration, comprising:

obtaining a timing indication field (TIF) from a downlink control information (DCI) in a subframe; and
reconfiguring a channel timing for a specified UL-DL configuration using the TIF, wherein the channel timing is selected from the group consisting of a physical downlink shared channel (PDSCH) hybrid automatic repeat request (HARQ) timing, a physical uplink shared channel (PUSCH) scheduling timing, a PUSCH HARQ timing, and combinations thereof.

19. The method of claim 18, further comprising:

decoding each physical downlink control channel (PDCCH) in a flexible subframe (FlexSF), wherein the flexible subframe is capable of changing an uplink-downlink transmission direction for a set of UL-DL configurations.

20. The method of claim 18, wherein the TIF includes 3-bits to provide a mapping to a legacy UL-DL configuration.

21. The method of claim 18, wherein the TIF includes 1-bit to indicate a change in the channel timing for the specified UL-DL configuration configured through a system information block type 1 (SIB1) to a UL-DL configuration with an increase or decrease in downlink subframes relative to the specified UL-DL configuration.

22. The method of claim 21, wherein reconfiguring the channel timing for the specified UL-DL TDD configuration further comprises:

reconfiguring the PDSCH HARQ timing based on a combination of TIF values within subframes of a radio frame for a UL-DL configuration with an increasing number of downlink subframes relative to the specified UL-DL configuration;
reconfiguring the PDSCH HARQ timing based on a combination of TIF values within subframes of the radio frame for a UL-DL configuration with an decreasing number of downlink subframes relative to the specified UL-DL configuration, wherein the specified UL-DL configuration has a maximum number of downlink subframes in a set of legacy UL-DL configurations;
reconfiguring the PUSCH scheduling timing or the PUSCH HARQ based on a combination of TIF values within subframes of the radio frame for a UL-DL configuration with an increasing number of uplink subframes relative to the specified UL-DL configuration; or
reconfiguring the PUSCH scheduling timing or the PUSCH HARQ based on a combination of TIF values within subframes of the radio frame for a UL-DL configuration with an decreasing number of uplink subframes relative to the specified UL-DL configuration, wherein the specified UL-DL configuration has a maximum number of uplink subframes in a set of legacy UL-DL configurations.

23. At least one non-transitory machine readable storage medium comprising a plurality of instructions adapted to be executed to implement the method of claim 18.

24. A node device of a node configured to dynamically reconfigure an uplink-downlink (UL-DL) time-division duplexing (TDD) configuration, comprising:
- a processing module to encode downlink control information (DCI) including a timing indication field (TIF) in a physical downlink control channel (PDCCH), wherein the TIF is used to dynamically reconfigure a UL-DL TDD configuration of a user equipment (UE) by increasing or decreasing a number of uplink subframes in a radio frame from a semi-static UL-DL TDD configuration.

25. The node device of claim 24, further comprising:
- a transceiver module to transmit the PDCCH with the TIF to the UE and transmit a flexible subframe (FlexSF) configured as a downlink subframe, wherein the flexible subframe is capable of changing an uplink-downlink transmission direction for a set of UL-DL TDD configurations,
- wherein the node is selected from the group consisting of a base station (BS), a Node B (NB), an evolved Node B (eNB), a baseband unit (BBU), a remote radio head (RRH), a remote radio equipment (RRE), a remote radio unit (RRU), a central processing module (CPM), and combinations thereof.

26. The node device of claim 24, further comprising:
- a transceiver module to:
    - receive a physical downlink shared channel (PDSCH) hybrid automatic repeat request (HARQ) from the UE based on the reconfigured UL-DL TDD configuration;
    - receive a physical uplink shared channel (PUSCH) from the UE based on the reconfigured UL-DL TDD configuration; or
    - transmit a PUSCH HARQ to the UE based on the reconfigured UL-DL TDD configuration.

27. The node device of claim 24, wherein the DCI is encoded in a UE-specific search space, the TIF is conditionally padded to a legacy DCI, the TIF uses 3-bits to indicate a mapping to a legacy UL-DL TDD configuration or the TIF uses 1-bit to indicate a change from the semi-static UL-DL TDD configuration to another predefined UL-DL TDD configuration.

* * * * *